US012288933B2

(12) United States Patent
Zhou et al.

(10) Patent No.: US 12,288,933 B2
(45) Date of Patent: Apr. 29, 2025

(54) ANTENNA SYSTEM FOR SATELLITE APPLICATIONS

(71) Applicant: TICRA Fond, København (DK)

(72) Inventors: Min Zhou, København (DK); Erik Jørgensen, København (DK)

(73) Assignee: TICRA Fond, København (DK)

( * ) Notice: Subject to any disclaimer, the term of this patent is extended or adjusted under 35 U.S.C. 154(b) by 0 days.

(21) Appl. No.: 17/613,725

(22) PCT Filed: May 27, 2020

(86) PCT No.: PCT/EP2020/064752

§ 371 (c)(1),
(2) Date: Nov. 23, 2021

(87) PCT Pub. No.: WO2020/239865

PCT Pub. Date: Dec. 3, 2020

(65) Prior Publication Data

US 2022/0239009 A1 Jul. 28, 2022

(30) Foreign Application Priority Data

May 27, 2019 (EP) .................................... 19176757

(51) Int. Cl.
*H01Q 15/24* (2006.01)
*H01Q 1/08* (2006.01)
(Continued)

(52) U.S. Cl.
CPC ............. *H01Q 15/244* (2013.01); *H01Q 1/08* (2013.01); *H01Q 1/1235* (2013.01);
(Continued)

(58) Field of Classification Search
CPC .... H01Q 15/244; H01Q 1/1235; H01Q 1/288; H01Q 3/12; H01Q 21/0037; H01Q 21/24;
(Continued)

(56) References Cited

U.S. PATENT DOCUMENTS 10,826,165 B1 * 11/2020 Deju ...................... H05K 5/069
2017/0110803 A1 * 4/2017 Hodges .................. H01Q 1/288
(Continued)

FOREIGN PATENT DOCUMENTS

EP 1120856 A1 * 8/2001 ......... H01Q 15/0026

OTHER PUBLICATIONS

Wu, Z.H. et al. Circularly polarised reflectarray with linearly polarized feed. Electronics Letters, IEE Stevenage, GB, vol. 41, No. 7, Apr. 18, 2005, pp. 387-388, <ISSN: 0013-5194> <DOI: 10.1049/EL:20058158> (Year: 2005).*
(Continued)

*Primary Examiner* — Hoang V Nguyen
*Assistant Examiner* — Yonchan J Kim
(74) *Attorney, Agent, or Firm* — Knobbe, Martens, Olson & Bear, LLP

(57) ABSTRACT

An antenna system for satellite applications is provide, the antenna system comprising an antenna array and a feed structure, and the antenna array is a passive antenna array configured to have a first state and a second state, the second state being a first deployed state. The feed structure is configured to provide a linearly polarized incident field for the antenna array in the first deployed state. The antenna array comprises a plurality of array elements, and the plurality of array elements forms a polarization conversion surface configured for converting the linearly polarized incident field to a reflected/transmitted circular polarized field. The antenna array is configured so that the radiation pattern of the reflected/transmitted circular polarized field corresponds to a predetermined radiation pattern and an array element geometry and an array element position of each of the plurality array elements are configured to provide the predetermined radiation pattern.

16 Claims, 16 Drawing Sheets

(51) Int. Cl.

| | |
|---|---|
| ***H01Q 1/12*** | (2006.01) |
| ***H01Q 1/28*** | (2006.01) |
| ***H01Q 3/12*** | (2006.01) |
| ***H01Q 3/46*** | (2006.01) |
| ***H01Q 15/20*** | (2006.01) |
| ***H01Q 19/10*** | (2006.01) |
| ***H01Q 19/19*** | (2006.01) |
| ***H01Q 21/00*** | (2006.01) |
| ***H01Q 21/06*** | (2006.01) |
| ***H01Q 21/24*** | (2006.01) |

(52) U.S. Cl.
CPC ............... *H01Q 1/288* (2013.01); *H01Q 3/12* (2013.01); *H01Q 3/46* (2013.01); *H01Q 15/20* (2013.01); *H01Q 19/10* (2013.01); *H01Q 19/192* (2013.01); *H01Q 21/0037* (2013.01); *H01Q 21/061* (2013.01); *H01Q 21/24* (2013.01)

(58) Field of Classification Search
CPC ............ H01Q 1/08; H01Q 3/46; H01Q 15/20; H01Q 19/10; H01Q 19/192; H01Q 21/061
See application file for complete search history.

(56) References Cited

U.S. PATENT DOCUMENTS

2017/0179596 A1* 6/2017 Diaz ........................ H01Q 3/34
2018/0254547 A1* 9/2018 Cwik ....................... H01Q 3/06

OTHER PUBLICATIONS

International Preliminary Report on Patentability and Written Opinion for International App. No. PCT/EP2020/064752, dated Nov. 16, 2021, in 8 pages.
International Search Report and Written Opinion of the International Searching Authority for International App. No. PCT/EP2020/064752, dated Jun. 30, 2020, in 15 pages.
Wu, Z.H., et al. "Circularly polarized reflectarray with linearly polarized feed" Electronics Letters, IEE Stevenage, GB, vol. 41, No. 7, Apr. 18, 2005.
Rahmat-Samii, Yahya, et al. "A Novel Near-field Gregorian Reflectarray Antenna Design with a Compact Deployment Strategy for High Performance CubeSats" Oct. 20, 2017, retrieved from the Internet: https://mafiadoc.com/a-novel-near-field-gregorian-reflectarray-antenna-_5b7fd13f097c4783128b4632.html, pp. 1-6.
Da, Xinyu, et al. "Single-Layer Circularly Polarized Wide Band Reflectarray Antenna with High Aperture Efficiency" International Journal of Antennas and Propagation, vol. 2018, Jul. 3, 2018, pp. 1-7.
Hodges, Richard E. et al., "A Deployable High-Gain Antenna Bound for Mars: Developing a new folded-panel reflectarray for the first CubeSat mission to Mars" IEEE Antennas and Propagation Magazine, IEEE Service Center, Piscataway, NJ, US, vol. 59, No. 2, Feb. 21, 2017, pp. 39-49.

* cited by examiner

ANTENNA SYSTEM FOR SATELLITE APPLICATIONS

FIELD OF TECHNOLOGY

The present invention relates to antenna systems for satellite applications, particularly antenna systems for small satellites, such as U-class spacecrafts, such as CubeSat type satellites.

BACKGROUND

Satellites have typically been very large and complex structures which also required significant expenses and large dedicated rockets for launching the satellites into space.

In recent years, there has been a trend towards smaller satellites which can be launched into orbit at lower costs as they are lighter and thereby do not need the same amount of fuel as the large satellites for launching. Hereby, the smaller satellites can often share a rocket with a larger satellite, reducing the complexity of a launch. Furthermore, specific launch facilities for these smaller satellites are being developed.

There are, however, some design challenges with the small satellites, such as CubeSats. The electronics in the satellite needs to be smaller and there are significant space constrictions for any element which should go into the satellite. CubeSats are increasingly being used for missions requiring measurement equipment and electronic systems so that any element of the satellite needs to be carefully developed to fit within the small satellite. This is particularly true for antennas provided with the satellites as the functional requirements for the antennas are increased whereas the design constrictions of the smaller satellites require the antennas to have both low mass and low volume.

SUMMARY

It is an object of the present invention to provide an antenna system for satellite applications in general, and particularly for smaller satellites.

Accordingly, in one aspect of the present invention an antenna system for satellite applications is provided, the antenna system comprising an antenna array and a feed structure. The antenna array is configured to have a first state and a second state, the second state being a deployed state. The feed structure is being configured to provide a linearly polarized incident field for the antenna array in the deployed state. The antenna array comprises a plurality of array elements, such as a plurality of array elements arranged at or in a support layer. The plurality of array elements forms a polarization conversion surface configured for converting the linearly polarized incident field to a reflected/transmitted circular polarized field. The antenna array may be a passive antenna array. In some embodiments, the reflected/transmitted circular polarized field has a predetermined radiation pattern.

The antenna array is typically larger than the dimension of the satellite onto which it is mounted and thus, the antenna array is configured to be deployed after launch, for example with folding panels which unfold once the satellite is in orbit, thus for example, the antenna array may comprise panels, and the panels may be held against the side of the satellite during launch and deployed with a hinged system when in orbit. As the space inside the satellite is extremely limited, it is an advantage that the antenna array may be stowed outside of the satellite. Also, the feeding structure needs to as small as possible. The antenna system may be configured to be mounted on e.g. a 6 U CubeSat having dimensions of 10×20×30 cm, a 12 U CubeSat, etc. It is envisaged that the antenna system may be used with any type of satellite.

The antenna system may be used for any type of satellite applications needing an antenna system, and the antenna system may be used for measurement applications, radar applications, radiometer applications, sensor applications, communication applications, etc. The antenna system may be configured to receive and transmit electromagnetic radiation, particularly in the radio frequencies, RF, range, and the antenna system may be configured to only receive or only transmit RF signals.

In some embodiments, the antenna system including the antenna array and the feed structure is mounted for deployment above a first surface of the satellite, such as a top surface.

In order to ensure that the antenna array may be designed to be as efficient as possible and ensure at the same that no damage is made to the antenna array upon launch, the antenna array is typically provided in a first state, such as a stowed state, upon launch. The first state may be a compact state. The antenna array may have a smaller overall volume in the first state than in the second state. In the first state the antenna array may be folded, such as folded onto one or more sides of the satellite, the antenna array may form a roll, the antenna array may be provided within a satellite housing, the antenna array may be provided in the first state outside of a satellite housing, etc. The second state of the antenna array is a deployed state. In the deployed state, the antenna array may have a desired functional shape.

In some embodiments, the antenna array is a reflectarray antenna. In some embodiments, the antenna array is a transmit array antenna. In some embodiments, the antenna array is a planar antenna array, however, it is envisaged that the antenna array may also in some embodiments be a curved antenna array.

In some embodiments, the antenna array is a passive antenna array, such as an antenna array which is not electrically connected to a power source. In some embodiments, the antenna system further comprises a transmitter and/or receiver. The antenna array may be an antenna array which is not electrically connected to the transmitter and/or receiver. In some embodiments, the antenna array and the feed structure are separate structures, such that the antenna array and the feed structure are physically and/or electrically separated. In some embodiments, the feed structure is connected to the transmitter and/or receiver.

It is an advantage that array elements in the antenna array are passive array elements so that no power supply is needed to control and/or modify any properties for the antenna array element. It is a further advantage of having a passive antenna array as no electrical connections between the antenna array and a satellite on which the antenna array is mounted are needed. Hereby, a more simple and robust deployment mechanism may be implemented for deploying the antenna array from the first state to the second state. In particular, in order to achieve a certain gain, the antenna array needs to have a significant size and will inevitable cause strain on the deployment mechanism. It is therefore an advantage that the deployment mechanism can be simple and robust. In addition, it is an advantage if the deployment mechanism does not need to comprise electrical connections e.g. between the antenna array and the transmitter/receiver of the feed structure, or for controlling the antenna array elements.

In some embodiments, the antenna array is configured to, at least in the deployed state, be in alignment with a side of the satellite, such as in alignment with an end face of the satellite. The antenna array may be arranged so that at least one plane of the antenna array is parallel to the side of the satellite, such as substantially parallel, such as parallel+/−2%, such as parallel+/−5%, such as parallel+/−10% to the side of the satellite, such as to the end face of the satellite.

In some examples, a coordinate system may be defined such that the first side of the satellite, e.g. a top face of the satellite, defines a z, y plane, the y-axis being parallel to a longitudinal direction of the satellite, and the z-axis being parallel to a transverse direction of the satellite. The x-axis is pointing away from the z, y plane in a direction orthogonal to the z, y plane, and thus a direction pointing away from the first side of the satellite, such as in a direction away from the top face of the satellite.

The antenna array, or at least a part of the antenna array, may be configured to be parallel to the z-axis, such as substantially parallel to the z-axis, such as parallel to the z, x plane.

In some embodiments, the feed structure comprises at least one deployable element. It is an advantage of being able to also provide the feed structure in a first state and in a second state, wherein the second state is a deployed state to facilitate efficient stowing during launch. The first state may be a stowed state. In some embodiments, the feed structure, such as the at least one deployable element of the feed structure, is a planar element so that the feed structure in the first state can be stowed along an outer side of a satellite body. In some embodiments the feed structure is planar when the at least one deployable element is stowed.

Other types of feeds, such as feed horn antennas can be used, however, such feed structures are difficult to stow efficiently, such as in the first state.

In some embodiments, the feed structure comprises one or more radiating elements, the feed structure may comprise a radiating element array, including one of an array of radiating slots and an array of radiating patches.

In some embodiments wherein the feed structure comprises one or more radiating elements, the radiating elements, such as a radiating element array, such as a radiating slot array, is configured to be excited by e.g. a waveguide, by a cavity or by a metallic cavity. In some embodiments, a microstrip feed may be employed.

In some embodiments, the feed structure comprises a primary feed element and a secondary feed element. The at least one deployable element may comprise the secondary feed element.

The primary feed element may be configured to excite the secondary feed element when the secondary feed element is in the deployed state to provide an excited secondary feed element. The linearly polarized incident field may be provided by both the primary feed element and the excited secondary feed element.

In some embodiments the primary feed element comprises the radiating element array and the secondary feed element comprises a conductive surface. The primary feed element may comprise a connection to a power source, to a transmitter and/or receiver, etc., and the secondary feed element may be a parasitic/passive element. The primary feed element may be excited via a cavity, a waveguide, a microstrip feed, etc.

The secondary feed element is configured to receive radiation from the primary feed element and redirect the radiation toward the antenna array. In some embodiments, the secondary feed element is folded on top of the primary feed element in the first state, i.e. the stowed state. In the second state, the secondary feed element is configured to be deployed so as to form an angle, such as an opening angle, with respect to the primary feed element. The primary feed element is configured to be provided in the first surface of the satellite, such as in a top layer of the first surface. In some embodiments, the primary feed element is provided as a cavity in the first surface.

The antenna system is configured to be mounted on a satellite body, such as on a CubeSat. Most satellites have surfaces which are conductive which influences the design of the feed structure. Such conductive surfaces may also impact the incident field and the field distribution between the feed structure and the antenna array, particularly, if the feed structure is provided electrically close to, e.g. adjacent to, the satellite surface, such as to the first surface of the satellite onto which the antenna system is mounted. In some embodiments, the antenna system comprises a conductive surface extending from the feed structure to the antenna array.

In some embodiments, the field as emitted from the feed structure, such as emitted from the primary feed element and the secondary feed element, propagates along the first side of the satellite body to produce the incident linearly polarized field. The emitted field may have a linear polarization vector perpendicular, such as substantially perpendicular, to the first side of the satellite, such as a top face of a CubeSat. Any part of the emitted field having a linear polarization vector in the plane of the first side of the satellite will not propagate, or the propagation will be insignificant. The linear polarization vector being perpendicular to the first side of the satellite includes that the linear polarization vector forms an angle with the first side of the satellite of 90 degrees, such as of substantially 90 degrees, such as of 90 degrees+/−2%, such as of 90 degrees+/−5%, such as of 90 degrees+/−10%.

In some embodiments, the feed structure is being provided in alignment with the antenna array, such as e.g. with at least a part of the antenna array, such as with a center part of the antenna array. The at least one deployable element of the feed structure may be configured to be provided in alignment with the antenna array, e.g. with at least a part of the antenna array, such as with a center part of the antenna array, e.g. in the deployed state. The secondary feed element may be configured to be provided in alignment with the antenna array, e.g. with at least a part of the antenna array, such as with a center part of the antenna array. In some embodiments, one or more of the feed structure, the at least one deployable element and the secondary feed element may be configured to be in alignment with the antenna array, so that one or more of the feed structure, the at least one deployable element and the secondary feed element is provided parallel to the antenna array, such as substantially parallel, such as parallel+/−2%, such as +/−5%, such as +/−10% to the antenna array. One or more of the feed structure, the at least one deployable element and the secondary feed element is provided parallel to at least a center part of the antenna array, such as substantially parallel, such as parallel+/−2%, such as +/−5%, such as +/−10% to the antenna array. In some embodiments, the antenna array, such that e.g. at least one plane of the antenna array, is parallel with the z-axis of the coordinate system as defined above. In some embodiments the feed structure, including any one or more of the feed structure, the deployable element and the secondary feed element, is provided parallel with the antenna array.

It is an advantage that the feed structure, including any one or more of the feed structure, the deployable element and the secondary feed element, does not need to be rotated 45 degrees relative to the antenna array in order to obtain the linear to circular polarisation conversion, hereby e.g. stowing and deployment of the feed structure is less complex.

In some embodiments, the array elements are configured so that at least one axis of each array element is aligned in an angle of the 45 degrees with respect to the polarisation of the incident field. In some embodiments, at least one axis of each array element may be aligned in an angle of 45 degrees, such as 45+/−5 degrees, such as 45+/−10 degrees, with respect to a side of the antenna array, such as with respect to a transverse direction of the antenna array. In some embodiments, at least one axis of each array element may be aligned in an angle of 45 degrees with respect to the x-axis as defined above.

It has been found by the present inventors, that the individual array elements may be rotated instead of rotating the feed for the antenna array to obtain polarisation conversion. Thus, it has been found that rotating each array element with respect to the linearly polarized incident field instead of rotating the feed structure or the antenna array to ensure a 45 degrees angle of incidence for the linearly polarized incident field with the antenna array allows for an efficient polarisation conversion. This allows for a more simple set-up as the feed structure can be kept aligned with antenna array. Furthermore, it improves the antenna performance due to better usage of the antenna array aperture as it is easier to ensure tight packing of the elements to align with the edges of the panels. In some embodiments, the aperture efficiency may be improved.

In some embodiments, the plurality of array elements forms a polarization conversion surface configured for converting the linearly polarized incident field to a reflected/transmitted circular polarized field, wherein each of the plurality of array elements has at least one axis forming an angle of between 20-65 degrees, such as between 40-50 degrees, such as of about 45 degrees, such as of 45 degrees with the first surface of the satellite, such as with the x-axis as defined above. The one or more of the array elements may have an array element geometry being configured to have at least one axis forming an angle of between 20-65 degrees, such as between 40-50 degrees, such as of about 45 degrees, such as of 45 degrees with respect to the first surface of the satellite, such as with respect to the x-axis as defined above.

In some embodiments, the linearly polarized incident field is a vertically or horizontally polarized incident field, such as a substantially vertically or substantially horizontally polarized incident field, such as a linearly polarized incident field being a vertically or horizontally polarized incident field +/−2 degrees, such as +/−5 degrees, such as +/−10 degrees.

The array elements may be configured so that at least one axis of each array element is aligned in an angle of 45 degrees, such as an angle of substantially 45 degrees, such as in an angle of 45 degrees+/−2 degrees, such as +/−5 degrees, such as +/−10 degrees, with respect to the polarisation of the incident field.

In some embodiments, the horizontal and vertical are defined with respect to the first side of the satellite. The shape of the array element may be adjusted such that the ±90 degree phase shift is achieved, e.g. by determining an orientation of the array element, by determining a size of one or more array element features (length, width), etc.

In some embodiments, the linearly polarized incident field may be configured to have a polarisation forming an angle of 90 degrees with the antenna array. The array elements may be configured so that at least one axis of each array element is aligned in an angle of 45 degrees with respect to the polarisation of the incident field.

It is an advantage that the antenna structure is configured in an offset configuration such that blockage from the feed structure is avoided.

In some embodiments, the feed structure is an all-metal feed structure, such as a feed structure having only metallic elements, such as a feed structure having no di-electric elements.

In some embodiments, the feed structure may comprise an array of radiating elements, such as an array of slots, such as an array of waveguides, such as an array of slotted waveguides, such as an array of patches, etc.

The feed structure may comprise a slot antenna, such as a slot array antenna. It is emphasized that the slot array may be any array of radiating slots, and the slot array may have a plurality of slots, such as 2, 3, 4, 6 slots, etc. In some embodiments, the slots or cavities have a depth of 4 mm, such as 6 mm, such as 8 mm, such as between 2 mm and 10 mm. The length of the slots may be between ¼ and ¾ of a wavelength, such as approximately ½ wavelength, such as ½ wavelength+/−5%, such as ½ wavelength+/−10%, such as ½ wavelength+/−15%. In some embodiments, the slot array antenna may be a slotted waveguide array antenna, comprising one or more slotted waveguides. The slotted waveguide array may for example comprise two waveguides, each having four slots and each waveguide having a separate feed, such as a separate feeding waveguide.

In some embodiments, the slot array is fed using a cavity provided behind the slot array.

As an example, a slot array comprising a number of slot radiators, such as for example two, four, six, etc. slot radiators may be provided in an array, and the slot array may be excited using a single slot or cavity, in which the number of slot radiators are located on the top, with the single slot for excitation located on the bottom face. Thus, the slot for excitation may be provided below the slot array, and the slot for excitation may extend below the entire slot array.

In some embodiments, the at least one deployable element comprises the array of radiating elements, such as an array of slots, such as an array of radiating waveguides, such as an array of slotted waveguides, such as an array of radiating patches, etc. The array of radiating elements may be excited from an excitation source in the at least one deployable element; the excitation source may be any known excitation source, such as a radiating slot, such as a cavity, such as a waveguide, such as microstrips, etc.

The slot array may be provided in the deployable element, and the RF power from the transmitter/receiver may be transferred to the slot array, e.g. through the cavity.

In some embodiments, the feed structure comprises a primary feed and a secondary feed. The primary feed may comprise a feed antenna, such as e.g. the slot array as discussed above, such as a slotted waveguide array, etc., and the secondary feed may be provided to reflect the electromagnetic field emitted from the primary feed towards the antenna array. The secondary feed may be a parasitic or passive element. Preferably, the primary feed is mounted in the top face of the satellite, such as in a fixed position. The primary feed may be mounted in the top face of the satellite, so that it is flush with the surface of the satellite. The secondary feed may form part of the deployable element. In some embodiments, the secondary feed forms the deployable element.

It is an advantage of having the primary feed element being a non-deployable element being configured for radiation of an electromagnetic field towards the secondary feed element when the secondary feed element is in the deployed state. In some embodiments, the secondary feed element comprises a conductive surface, such as a planar conductive surface, and the secondary feed element may be positioned so as to receive the electromagnetic field emitted from the primary feed element, and reflect the received electromagnetic field towards the antenna array. The incident field for the antenna array is formed by the electromagnetic radiation emitted from the primary feed element, and the electromagnetic radiation reflected from the secondary feed element.

Using a primary feed element being positioned in or at the surface of the satellite, such as in or at the first surface of the satellite, and a secondary feed element being a passive or parasitic element has the advantage of avoiding any electrical connections through a deployment mechanism for the secondary feed. This significantly simplifies the deployment mechanism.

Typically, the secondary feed element is a planar element, the secondary feed element may be a plate having a conductive surface. In some embodiments, the secondary feed element comprises an electromagnetic reflecting surface, such as a passive electromagnetic reflecting surface, including a conductive surface, a reflectarray, such as a passive reflectarray, etc. The plate may be rectangular. The secondary feed element may, in the deployed state, be provided so that the secondary feed element forms an angle, such as an opening angle, of 50° with the surface of the satellite, such as an angle, such as an opening angle, of between 15° and 90°, such as between 40° and 60°. The secondary feed element is typically provided centered above the primary feed. The secondary feed element may curved, but it is an advantage that the secondary feed element is planar as this improves the storage complexity.

The feed structure may be provided in a center section of the first surface of the satellite, such as centered with respect to the antenna array, so that for example, the feed structure is provided facing a center, such as a center part, such as a center panel, of the antenna array. In such an embodiment, the secondary feed element is positioned so that a base of the secondary feed element is parallel to the center of the antenna array, such as substantially parallel to the center of the antenna array. The base of the secondary feed element may be the part of secondary feed element interconnecting with the first side of the satellite.

In some embodiments, the feed structure is provided off-set to the center section of the first side of the satellite, such as off-set with respect to a center of the antenna array. In such a case, typically, the secondary feed element will be positioned so that the secondary feed directs the reflected electromagnetic radiation towards the antenna array. The secondary feed element, such as the base of the secondary feed element, may thus form an angle different from 0° with respect to the antenna array, such as an angle with respect to a central part of the antenna array, such as an angle of 10°, such as an angle of 15°, such as an angle between 0° and 20°, the angle being determined based on the off-set between a center of the antenna array and a center of the secondary feed element.

In some embodiments, the antenna array is provided at one or more panels. The antenna array may be provided in a single panel configuration or in a multi-panel configuration.

The antenna array may be provided in a multi-panel configuration and the antenna array may be provided at a plurality of panels with a central panel and e.g. two side panels, wherein the side panels in the deployed state forms an angle with the central panel. Each panel of the antenna array may comprise a support layer and array elements provided at the support layer.

The support layer supporting the array elements may comprise a composite material, such as a di-electric material, such as a Rogers PCB material. The support layer may comprise multiple layers such as several layers of dielectric materials. The support layer may furthermore comprise a honeycomb structure, providing stiffness to the support layer while reducing the weight of the support layer.

In some embodiments, the support layer comprises a plurality of layers, and the plurality of layers may form a sandwich structure. In some embodiments, the plurality of layers are assembled in a symmetric manner, e.g. such as symmetric about a center axis. It is an advantage of having a symmetric support layer in that the risk of distortions from mechanical and thermal loading is reduced.

In some embodiments the support layer comprises a metallic material, and in some embodiments, the support layer is an all-metallic material, such as a support layer formed in a single metallic material. The array elements may be formed in the metallic material, e.g. by providing array elements as protrusions and/or indentations in the metallic material. In some embodiments, the support layer may be a metallic coated layer. In some embodiments, the all-metallic structure does not comprise any di-electric material. In some embodiments any active elements in feed structure are all metallic. In some embodiments, no active elements comprises a dielectric material.

The support layer may comprise a membrane, the support layer may comprise a canopy, the support layer may comprise a foil, etc.

In some embodiments the antenna array comprises a support layer and array elements provided in or at the support layer. For example, the array elements may be provided in a copper layer at a first side of a dielectric substrate, such as a Rogers substrate. The array elements may for example be etched in a metal layer at the first side of the dielectric substrate. The second side, or backside, of the dielectric substrate, may be covered by a solid metal layer acting as a ground plane for the incident field, e.g. the incident field illuminating the array elements. The metal layer may be formed of any suitable metal including copper, gold, silver, aluminium, etc. In some embodiments, the array elements and the ground plane forms a reflectarray.

To increase the mechanical stability of the antenna array, and of any antenna array panels, the dielectric substrate may be positioned on a stability core, such as a fibre core, such as glass fibre core, such as a carbon fibre core, etc. The stability core may be treated with a prepreg for assembly with the metal coated dielectric layer.

To ensure a symmetric antenna array, a further dielectric substrate is provided at the back side of the stability core, the further dielectric substrate having a metal layer, such as a copper layer, on both sides.

Thus, in some embodiments a structure, such as a sandwich structure, such as a symmetric sandwich structure may be provided, having a stability core, and a dielectric layer on each side, both dielectric layers having a conductive coating on both sides, typically, also a prepreg is provided between the stability core and the coated dielectric layer.

In some embodiments, the thickness of the antenna array is less than 10 mm, such as less than 5 mm, such as less than 2.5 mm, such as less than 2 mm. The thickness of the antenna array may be between 2 mm and 5 mm, such as between 2 mm and 4 mm.

The antenna system may be configured to receiving, emitting and transmitting electromagnetic radiation above a frequency of 6 GHz, such as above 8 GHz, such as above 18 GHz, such as above 27 GHz, such as in a frequency range between 6 GHz and 100 GHZ, between 7 GHz and 100 GHz, between 6 GHz and 40 GHz, such as between 8 GHz and 40 GHz, such as between 18 GHz and 40 GHz, such as between 8 GHz and 27 GHz, such as in the X band of typically 8-12 GHz; such as in the K band of typically 18-27 GHz, such as in the Ka band of typically 27-40 GHz.

In some embodiments, the array elements are provided at a first side of the support layer and a ground plane may extend on a second side of the support layer, the second side being opposite the first side. The ground plane forming a ground plane for the array elements. The ground plane may be formed of a metal layer, such as a copper layer.

The array elements may be provided in or at the support layer using any known techniques. For example, the array elements may be printed onto the support layer in e.g. copper, or the array elements may be formed in a conductive support layer, such as in a metallic support layer.

Typically, the array elements are distributed over the support layer, and each array element may be provided within a unit cell.

The array elements may be patch elements, such as patch type elements, such as rectangular patch elements. The array elements may be cross dipole elements. The array elements may be slot type elements, such as rectangular slots, such as cross slot elements.

The array elements be asymmetric array elements. The array element may have an asymmetric shape, such as a shape having asymmetry in at least one axis. The array elements may have the shape of irregular polygons. The array elements may have a shape having two or less lines of symmetry, i.e. having no more than two lines of symmetry.

It is an advantage of using an asymmetric array element, such as an array element having an asymmetric shape, such as a patch element having asymmetry in at least one axis, in that the polarization conversion is performed in an optimized way when the shape is asymmetric.

In some embodiments, the array element is formed in a single layer, such as in a single layer of material provided at a support substrate. It is an advantage to use array elements formed in only one layer, such as in a single layer, as complexity and the overall thickness of the design may be reduced. Additionally, by having a single layer, problems with heat dissipation in multi-layered array elements are mitigated.

This is particularly important for space applications. Additionally, in some embodiments, the support substrate should comprise as few layers as possible, and in a preferred embodiment, the support substrate should be formed in a single layer to further reduce complexity and the overall thickness of the support substrate. It is an advantage to keep also the support layers as thin as possible as there are stringent stowing requirements for antenna devices in satellite applications, such as particularly for CubeSats.

Typically, each array element of the plurality of array elements is characterized by an array element position and an array element geometry.

In some embodiments, each array element of the plurality of array elements has a fixed surface impedance.

In some embodiments, each array element may have an array element geometry being determined in dependence on a phase of the linearly polarized incident field at the position of the specific array element. For example, a first array element may have a first array element geometry being determined in dependence on a phase of the linearly polarized incident field at the position of the first array element, Each array element geometry may additionally be determined in dependence of any surrounding array elements and a phase of the linearly polarized incident field at the position of each surrounding array elements. The surrounding elements may be considered to be an infinite number of surrounding array elements during the determination.

In some embodiments, the array element geometry is configured to have at least one axis forming an angle of 45° with respect to the polarization of the incident field. Thereby, a 90° phase shift may be implemented to convert the linearly polarized incident field to a circular polarized reflected/transmitted field. In some embodiments, the linearly polarized incident field is a vertically (or horizontally) polarized field (or wave), such as a substantially vertically (or horizontally) polarized field (or wave), and the array element geometry is configured to have at least one axis forming an angle of 45° with respect to the vertically or horizontally polarized wave, such as an angle of substantially 45°.

The antenna array is configured so that the radiation pattern of the reflected/transmitted circularly polarized field corresponds to a predetermined radiation pattern and wherein an array element geometry and an array element position of each of the plurality array elements are configured to provide the predetermined radiation pattern.

In some embodiments, a geometry of the array element is configured to control a phase response and/or a polarisation response of the array element in the antenna array to obtain the predetermined radiation pattern. In some embodiments, the predetermined radiation pattern is characterized by having a circular polarisation.

In some embodiments, the array elements are cross-dipole elements. The geometry of the each individual array element is determined using a direct optimization approach where the parameters of each individual array element are determined directly to fulfil certain predetermined radiation patterns. This includes both the collimation of the radiation pattern and the polarisation conversion from linear to circular polarisation. During the design, the analysis is performed using a spectral domain method of moments assuming local periodicity, i.e., each individual array elements is analysed assuming that it is located in an infinite array consisting of identical array elements. During the design, the actual feed pattern, including the angle of incidence, is taken into account to maximize the antenna performance. During the design, multiple frequencies in the operating frequency bands are taken into account to ensure optimal performance within the operating bands.

As the antenna array and the feed structure are both mounted on the satellite, the antenna array will be within the near field of the feed structure.

In another aspect of the present invention, an antenna system is provided, the antenna system comprises an antenna array and a feed structure. The feed structure is configured to provide an incident field for the antenna array and comprises a primary feed element and a secondary feed element. The feed structure comprises at least one deployable element. The at least one deployable element comprises the secondary feed element. The primary feed element may be configured to excite the secondary feed element in a deployed state to provide an excited secondary feed element. The incident field is provided by the primary feed element and the excited secondary feed element. The antenna array is configured to have a first state and a second state, the second state being a deployed state. The antenna array may be any antenna array, and the array elements may be active array elements or passive array elements. The feed structure is being configured to provide a circular polarized, an elliptical polarized or a linearly polarized incident field for the antenna array in the deployed state. The antenna array comprises a plurality of array elements arranged at or in a support layer, for reflecting and/or transmitting the incident field.

The primary feed element and the secondary feed element are configured in accordance with the description above for the first aspect of the invention mutatis mutandis. Thus, the primary feed element may comprise a connection to a power source, to a transmitter and/or receiver, etc., and the secondary feed element may be a parasitic/passive element. The primary feed element may be excited via a cavity, such as via a waveguide, a microstrip feed, etc. The secondary feed element may be configured to receive radiation from the primary feed element and redirect the radiation toward the antenna array. In some embodiments, the secondary feed element is folded on top of the primary feed element in the first state, i.e. the stowed state. In the second state, the secondary feed element is configured to be deployed so as to form an angle, such as an opening angle, with respect to the primary feed element. The primary feed element is configured to be provided in the first surface of the satellite, such as in a top layer of the first surface. In some embodiments, the primary feed element is provided as a cavity in the first surface.

The present invention relates to the different aspects including the antenna systems described above and in the following, and corresponding antenna systems, systems, methods, devices, uses and/or product means, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION OF THE DRAWINGS

FIGS. 1*a*-1*d* illustrate schematically different perspectives of an embodiment of a deployed antenna array 6 and a deployed feeding structure 4 as mounted on a satellite 8, such as e.g. a 3 U CubeSat, a 6 U CubeSat, a 12 U CubeSat, etc.

The antenna system 2 comprises an antenna array 6 and a feed structure 4. The antenna array 6 is configured to have a first state and a second state, the second state being a deployed state as shown exemplary in FIGS. 1*a*-1*d*. The feed structure 4 is being configured to provide an incident field for the antenna array 6 in the deployed state.

Figure 1A:
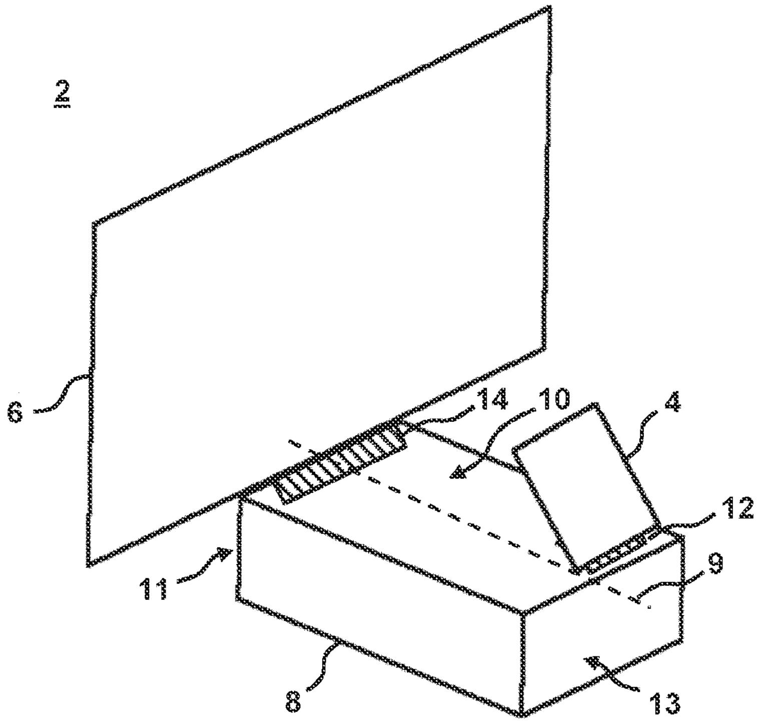
FIGS. 1*a*-1*e* illustrate schematically different perspectives of an embodiment of a deployed antenna array and a deployed feeding structure as mounted on a satellite.

In FIG. 1*a*, the antenna array 6 is shown in the deployed state and mounted at a satellite 8. The feed structure 4 is likewise mounted at the satellite. FIG. 1*a* illustrates the antenna array 6 and the feed structure 4 as mounted at a first side 10 of the satellite. However, it is envisaged that the mount for the antenna array may be provided also at other sides configuring the antenna array for deployment above the first surface. A deployment mechanism 12, 14 allows the feed structure and the antenna array, respectively, to be deployed from a first state, such as a stowed state, to the deployed state as shown in FIG. 1*a*. It is seen that the feed structure 4 is off-set with respect to a center axis 9 of the antenna array 6. To ensure that the incident field is efficiently directed towards the antenna array, the feed structure 4 may be tilted with respect to an axis perpendicular to the center axis 9, e.g. by 3-5 degrees to reduce spill over. It is an advantage of being able to provide the feed structure off-set with respect to the center axis, as satellites, e.g. the casing of the satellite, often have a metal stabilizing bar along the center of the satellite at the first surface. Thus, by allowing the feed structure 4 to be off-set from the center axis 9, and thus a center of the satellite, no structural amendments to a casing of the satellite is needed as the feed structure 4 may be provided in a recess or cavity at a position of the first surface in which the casing of the satellite does not contain stabilizing bars.

It is seen that the feed structure is located as close as possible to the back of the satellite, that is as far as possible from the antenna array, so that if the antenna array is provided at a first end 11 of the first surface 10, the feed structure 4 is provided at a second end 13 of the first surface 10; the first end and the second end being opposite each other.

Figure 1B:
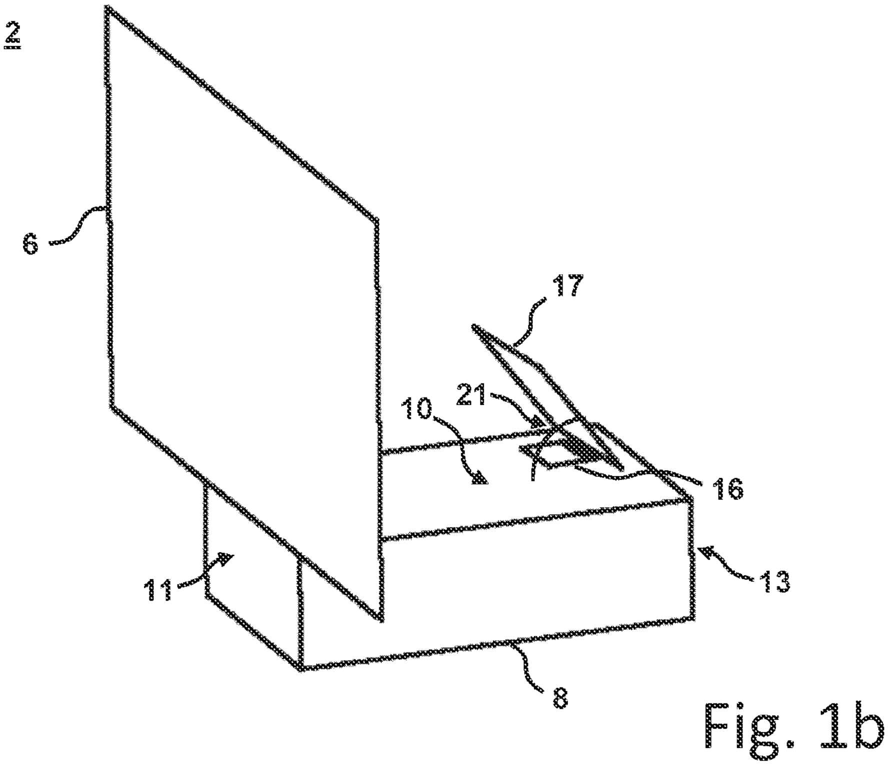

FIG. 1*b* shows a different view of the antenna system 2 of FIG. 1*a*. It is seen that the feed structure 4 comprises a primary feed element 16 and a secondary feed element 17. The primary feed element 16 may be an active element connected to a transmitter/receiver (not shown) of the satellite 8 and be configured to excite the secondary feed element 17 when the secondary feed element 17 is in the deployed state to provide an excited secondary feed element. The secondary feed element 17 may be a passive feed element. The linearly polarized incident field may be provided by both the primary feed element 16 and the excited secondary feed element 17. The primary feed element 16 is flush-mounted in a fixed position on the first side 10 of the satellite and the secondary feed element is positioned so as to receive the radiation from the primary feed element 16 so that the secondary feed element 17 act as a sub-reflector to direct radiation towards the antenna array 6. having an opening angle 21 between the deployed secondary feed element 17 and the primary feed element being mounted in the first side of the satellite.

Figure 1C:
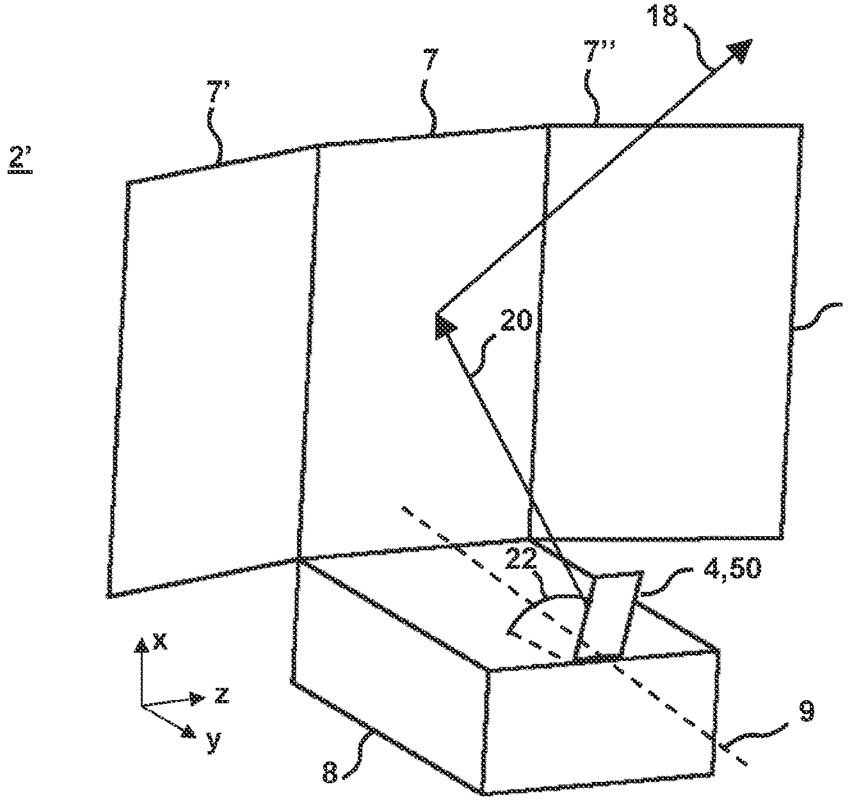

FIG. 1*c* shows an antenna system 2', the antenna system 2' comprising an antenna array 6 provided at three panels 7, 7' and 7". The center panel 7 and two outer panels 7' and 7". The panels 7, 7' and 7" may have identical sizes, and may be for example 200 mm×335 mm. It is envisaged that the panels 7, 7', 7" in other embodiments may have different sizes. The outer panels 7', 7" are slightly tilted with respect to the center panel. Hereby, the bandwidth performance may be enhanced, by reducing the spatial phase delay from the feed. The feed structure 4 is a deployable feed structure 4 and thus the illustrated feed structure 4 is the deployable element 50 and the feed structure 4 is in the deployed state configured to direct radiation from the feed structure 4 towards the antenna array 6. The feed structure is a substantially planar feed structure and forms an angle 22 greater than 90° with the first surface 10 of the satellite. The angle 22 is selected in accordance with the size of the satellite, may typically be between 100° and 120°, for example for a 6 U CubeSat. The feed structure folds in the stowed state towards the first side 10 and is deployed to form the angle with the first surface. It is seen that the feed structure 4 is provided centered around the center axis 9 of the antenna array 6 to ensure that the incident field is efficiently directed towards the antenna array.

In FIG. 1*c*, the field reflected from the antenna array 6 is illustrated with arrow 18 and the incident field is illustrated schematically with arrow 21. The antenna array 6 in FIG. 1*c* is thus a reflectarray antenna array. As illustrated in FIG. 1*c*, in some examples, a coordinate system may be defined such that the first side of the satellite, e.g. a top face of the satellite, defines a z, y plane, the y-axis being parallel to a longitudinal direction of the satellite, and the z-axis being parallel to a transverse direction of the satellite. The x-axis is pointing away from the z, y plane in a direction orthogonal to the z, y plane, and thus a direction pointing away from the first side of the satellite, such as in a direction away from the top face of the satellite.

The antenna array, or at least a part of the antenna array, may be configured to be parallel to the z-axis, such as substantially parallel to the z-axis, such as parallel to the z, x plane.

Figure 1D:
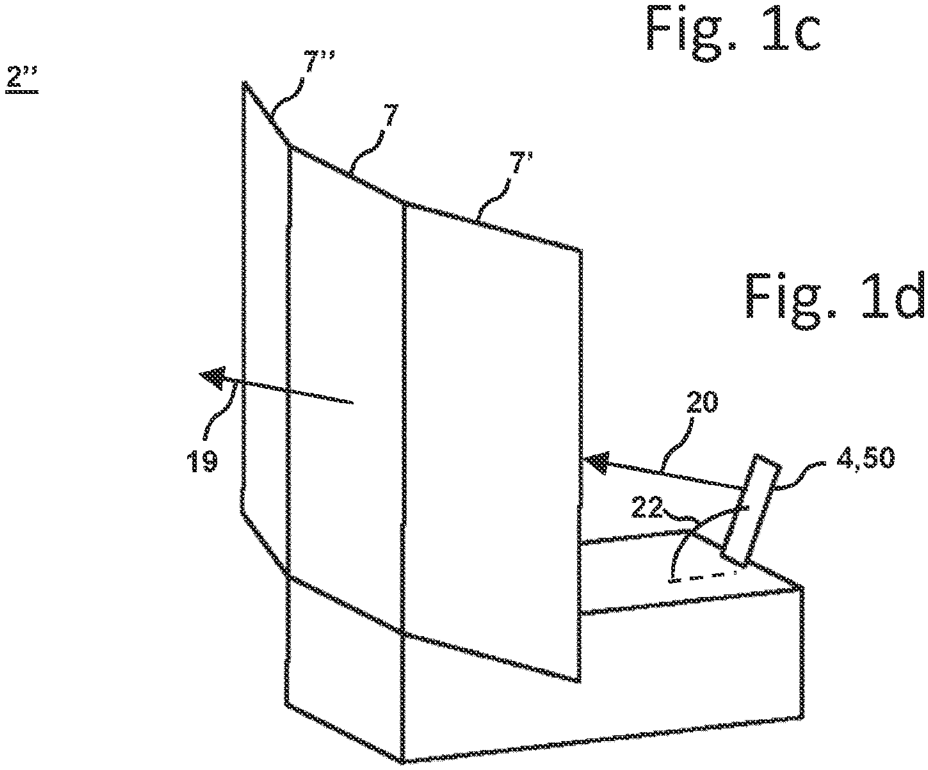

FIG. 1*d* shows a further antenna system 2". The antenna system 2" corresponds to the antenna system 2' in that the antenna array comprises three panels 7, 7', 7" and the two outer panels 7', 7" are tilted with respect to the center panel. The feed structure is a substantially planar feed structure and forms an angle 22 greater than 90° with the first surface 10 of the satellite. The angle 22 is typically between 100° and 120°, for example for a 6 U CubeSat. The feed structure folds in the stowed state towards the first side 10 and is deployed to form the angle with the first surface. The illustrated deployable feed structure 4 may therefore be the deployable element 50.

In FIG. 1*d*, the arrow 21 illustrates schematically the incident field, and the arrow 19 illustrates the transmitted field. The antenna array 6 in FIG. 1*d* is thus a transmit array antenna array.

Figure 1E:
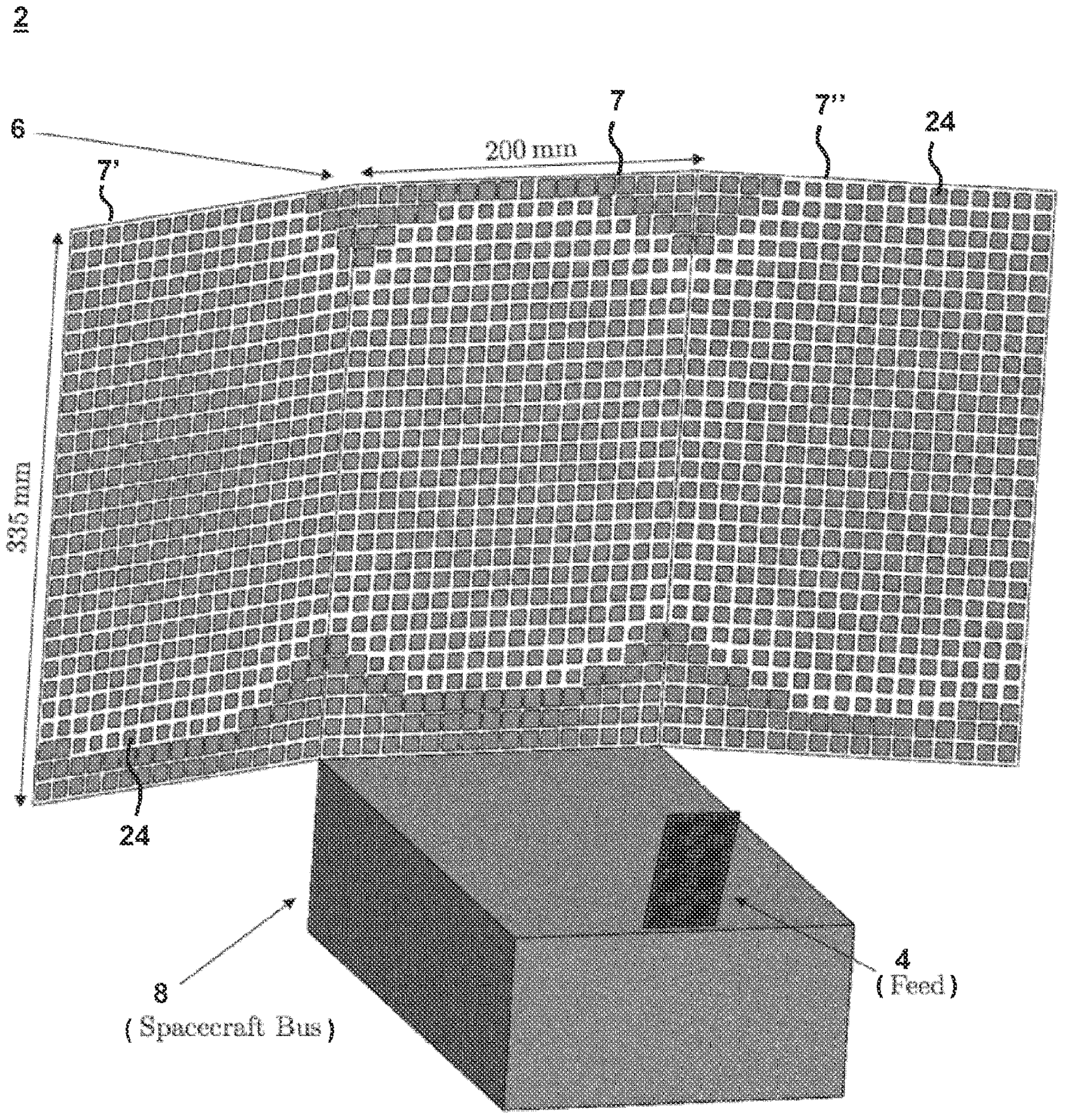

FIG. 1*e* shows in more detail an antenna system according to FIG. 1*c*. The antenna array 6 comprises three panels, a center panel 7 and two outer panels 7', 7" tilted with respect to the center panel 7. The feed structure 6 is shown, and the array elements 24 of the antenna array 6 are also shown. It is seen that the size of the array elements 24 varies with respect to the position of the array elements 24 on the antenna array 6.

The antenna array 6 comprises a plurality of array elements 24 arranged at or in a support layer (not shown in FIG. 1*e*), and the plurality of array elements 24 may form a polarization conversion surface configured for converting a linearly polarized incident field 20 to a reflected/transmitted circular polarized field 18,19. The antenna array 6 may be a passive antenna array.

Figure 2A:
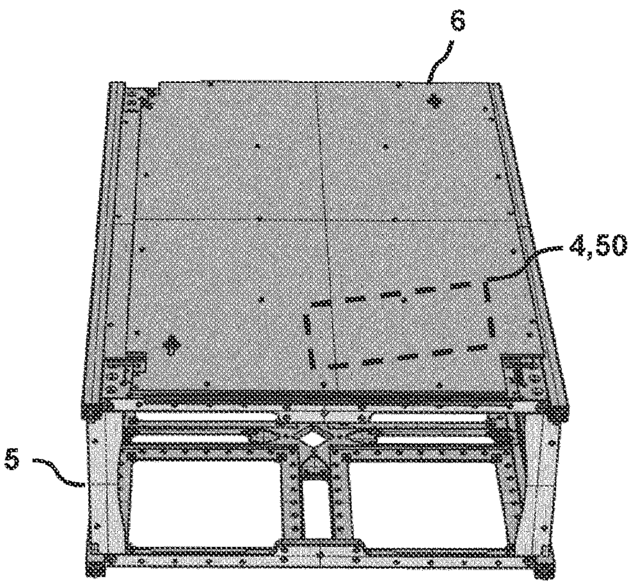
FIGS. 2*a* and 2*b* illustrate schematically a satellite having an antenna array and a feed structure in the stowed state and the deployed state.
Figure 2B:
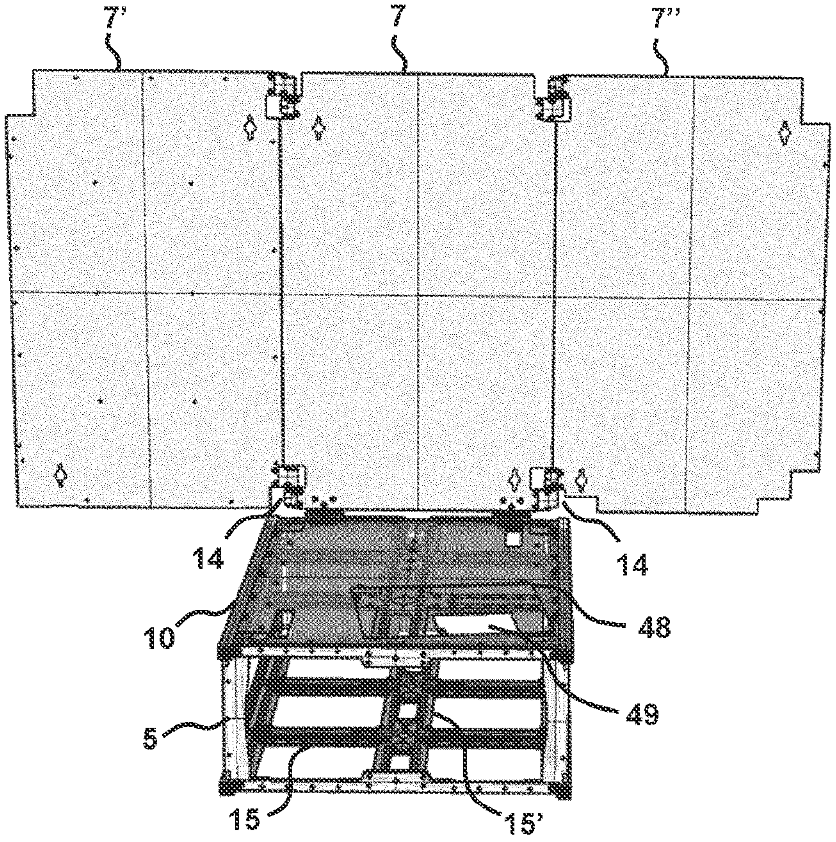

FIG. 2*a* illustrates a satellite body 5 having an antenna array 6 and a feed structure 4 in the stowed state. It is seen that center panel 7, and the side panels 7', 7" are folded onto the top of the satellite body 5, i.e. onto the first surface 10. The feed structure 4, that is particularly the deployable element 50, is folded into a cavity of the first surface 10 below the antenna array panels 7. The feed structure 4 may be any suitable feed structure. It is advantageous if the feed structure may be folded into a planar package when stowed to allow for a compact first state of the feed structure. FIG. 2*b* illustrates the deployed antenna array 6. It is seen that the panels 7, 7', 7" are hinged together and mounted at the satellite body 5 via deployment mechanisms 14. The antenna array 6 is seen mounted at a first end of the satellite body 5, such as at a first end 11 of the first side 10. The satellite body 5 comprises a number of stabilizing bar 15, including a center stabilizing bar 15'. It is seen that two cavities are formed in the first surface 10. A first cavity 48 configured to accommodate the deployable element, e.g. 4, 17, of the feed structure, and a second cavity 49 configured to accommodate the feed, such as the primary feed element 16. The first cavity 48 has a first depth and the second cavity 49 has a second depth. It is seen that the first cavity 48 is shallower than the second cavity, so that the first depth is less than second depth. It is seen that the first cavity may extend over the center stabilizing bar 15' immediately below the first surface 10, while the second cavity 49 is provided between any stabilizing bar 15, 15' of the satellite body 5.

Figure 3A:
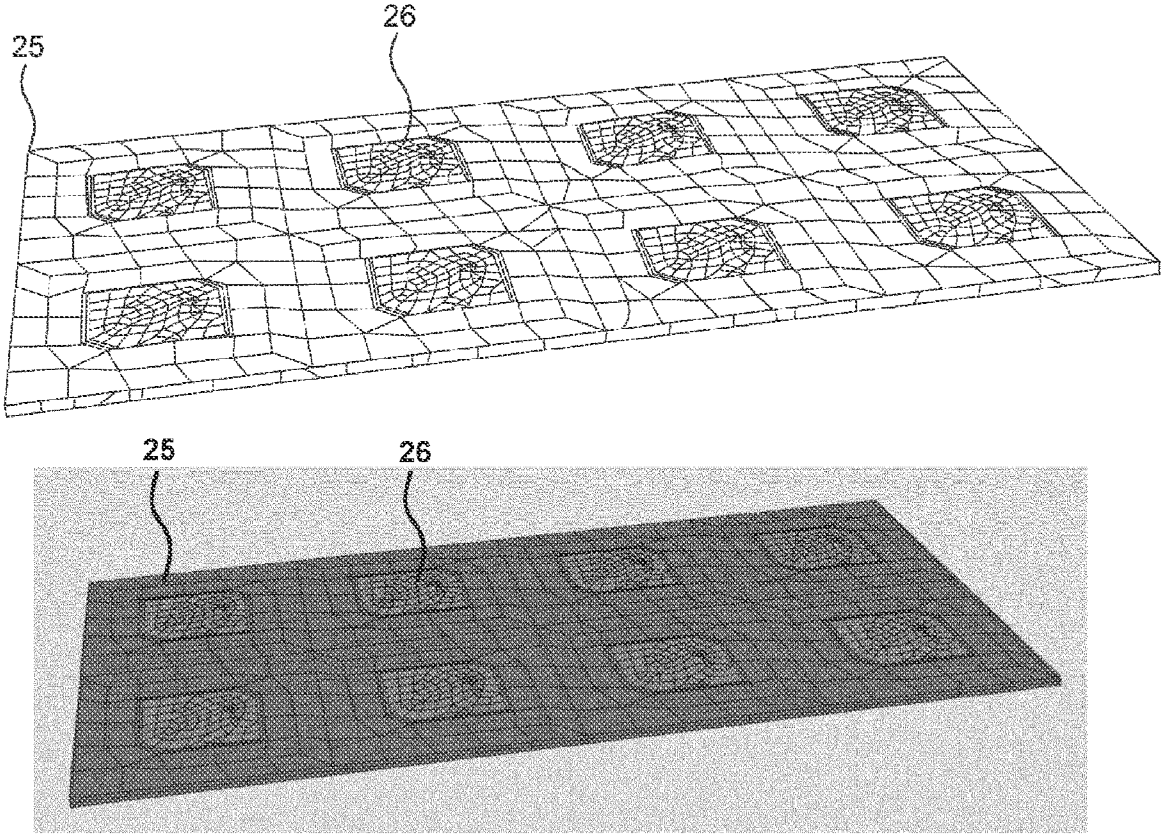
FIG. 3*a* shows schematically a patch array feed structure.

In FIG. 3*a*, a feed structure 4 is illustrated comprising a 2 by 4 microstrip patch array 25 on a single-layer dielectric substrate. The feed structure may be configured to radiate linear polarized field in any known way. Hereby, the linear polarized field may be generated with a single, two or four probes per patch 26. The number of probes per patch may influence the width of the frequency band in which an efficient feed is provided. Having a single probe per patch may result in a narrow frequency band of e.g. about 1%, however, by increasing the number of probes to 2 or 4 per patch 26, the bandwidth may be broadened. The feed structure 4 as shown in FIG. 3*a* needs to be mounted via a deployment mechanism, such as a rotary joint, and such a deployment mechanism will need to include also the electrical connections.

Alternatively, the feed structure 4 may include a slot antenna element which may be fed using a cavity, or a waveguide, behind the slot antenna element. It has been found that using a metallic cavity feed behind the slots increases the frequency bandwidth of the system.

The slot antenna element may for example be realized using two rows each with four slots, that is a 2 by 4 slot array, these eight slots may then be fed using a separate cavity.

Figure 3B:
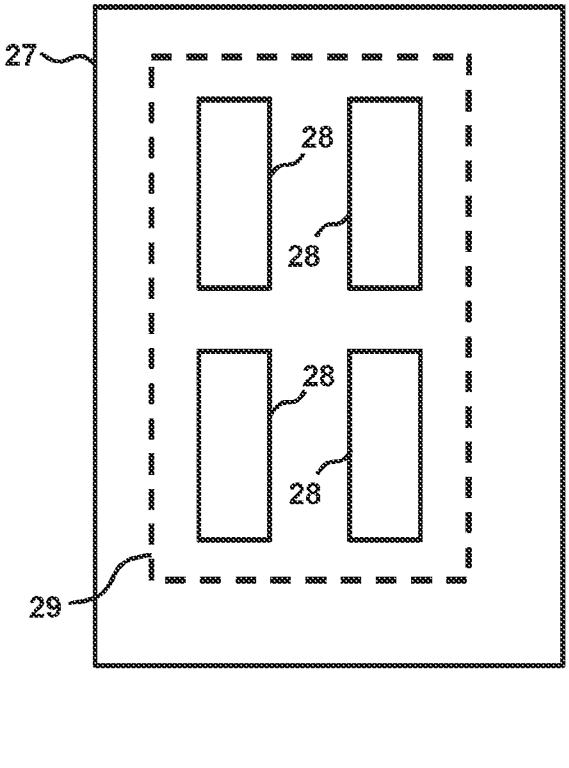
FIG. 3*b* shows schematically a slot array feed structure.

In FIG. 3*b* a feed structure 16 is shown providing a linearly polarized incident field. A primary feed structure 16 comprising a fixed slot array 27 is shown in which four slot antenna elements 28 in a two by two setup are excited by a single cavity 29 below the slot antenna elements 28. The cavity 29 may extend below the entire fixed slot array. In some examples, two such feed structures as illustrated in FIG. 3*b* are combined to provide a total of eight radiating slot antenna elements 28.

This primary feed structure 16 is fixed in the first surface 10, and no deployment is necessary. Instead, the secondary feed structure 17 is mounted above the primary feed structure, to be illuminated by the field emitted from the primary feed structure 16. In combination, the primary feed structure 16 and the secondary feed structure 17 provides the incident field 20 for the antenna array 6.

It is envisaged that also a simple primary feed structure 16 having two slot antenna elements, such as a slot array having 2 slots in one row, may be used.

The dimension of the feed structure 16 may be as set out below:

| | |
|---|---|
| Cavity cut-off frequency | 6.9 GHz |
| Cavity width | 52.0 mm |
| Cavity height | 4.0 mm |
| Slot length | 1936 mm |
| Slot width | 6.0 mm |

Figure 4A:
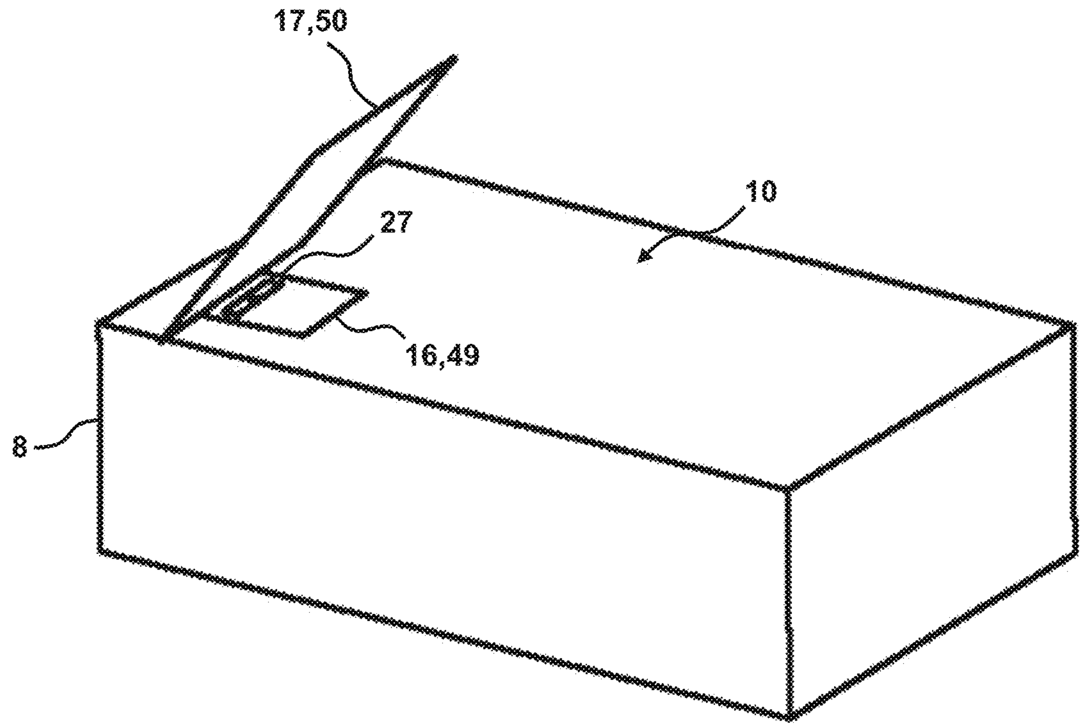
FIGS. 4*a* and 4*b* illustrate schematically the feed structure as mounted on the satellite.

In FIG. 4*a*, a feed structure 4 as mounted on the satellite 8 is illustrated schematically. It is seen that the primary feed element 16 includes 2 by 1 slot antenna elements to illuminate the secondary feed element 17. The primary feed element is flush mounted with the first surface 10 in the second cavity 49.

The field produced by this feed structure propagates along the surface of the satellite body, such as along the first surface 10.

Figure 4B:
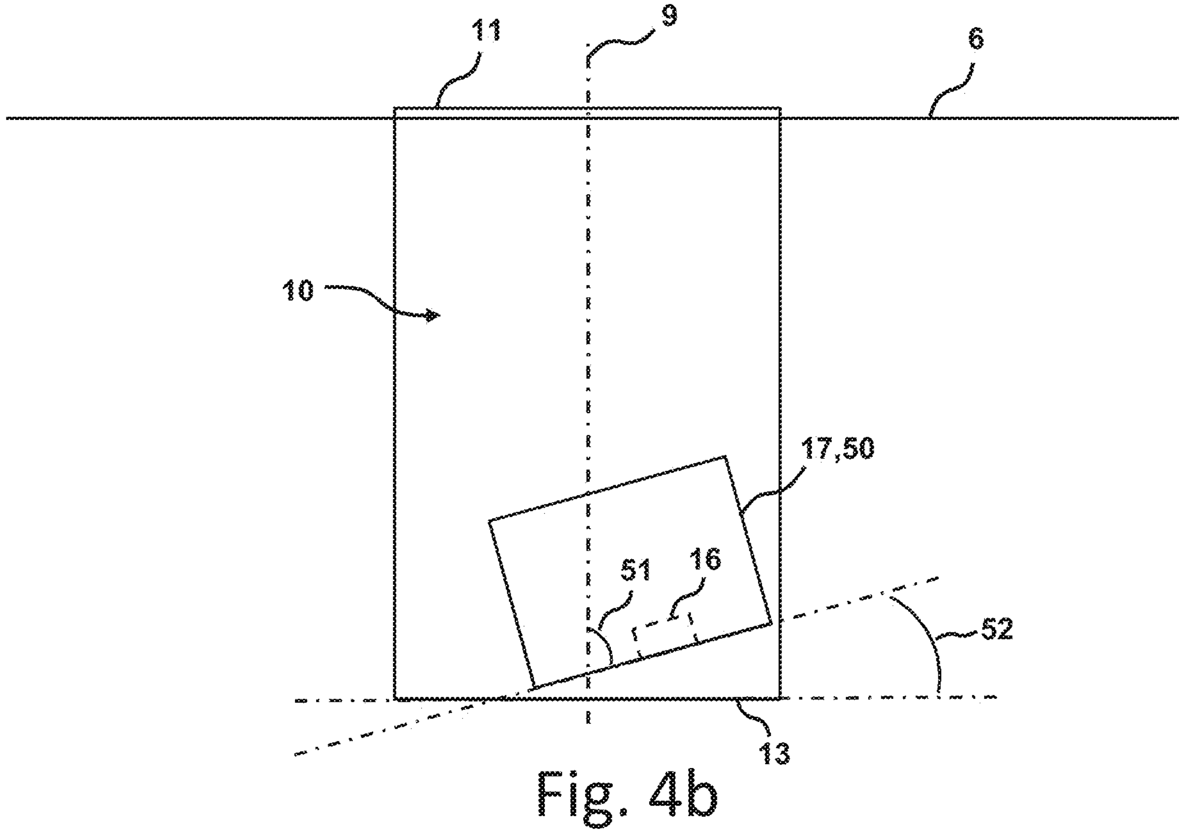

FIG. 4*b* illustrates the satellite of FIG. 4*a* as seen from above and including the antenna array 6. In FIG. 4*b*, it is seen that the feed structure 4 including the primary feed element 16 (dashed) and the secondary feed element 17, i.e. the deployable element 50, is provided off-center with respect to the center axis 9 of the satellite. Hereby, the primary feed element 16 may be provided in a cavity of the satellite body without having to cut into any of the stabilizing bars 15, 15' (not shown). When providing the feed structure 4 off-set with respect to the center axis 9 of the satellite body, the feed structure 4 is also off-set with respect to the antenna array 6. To reduce spill-over effects of the incident field; the feed structure, including the secondary feed element 17 is provided at an angle 51 to the center axis 9 different from orthogonal. For a feed structure 4 provided centered around the center axis 9, the secondary feed element 17 will form an orthogonal angle 51 with respect to the center axis 9, such as a substantially orthogonal angle. This is particularly so when the antenna array 6 is provided centered about the center axis 9. The angle 52 between the antenna array 6 and the feed structure 4 may also be defined and will typically be 0° when the feed structure is not off-set (i.e. the feed structure and the antenna array are parallel, such as substantial parallel) and change when the feed structure 4 is off-set with respect to the center axis 9 or with respect to a center of the antenna array.

It is envisaged that the position of the feed structure 4, 16, 17 should be determined with respect to the position of the antenna array 6, such as the position of the antenna array in the deployed state, so as to reduce or minimize any spill-over of the field emitted from the feed structure.

Figure 4C:
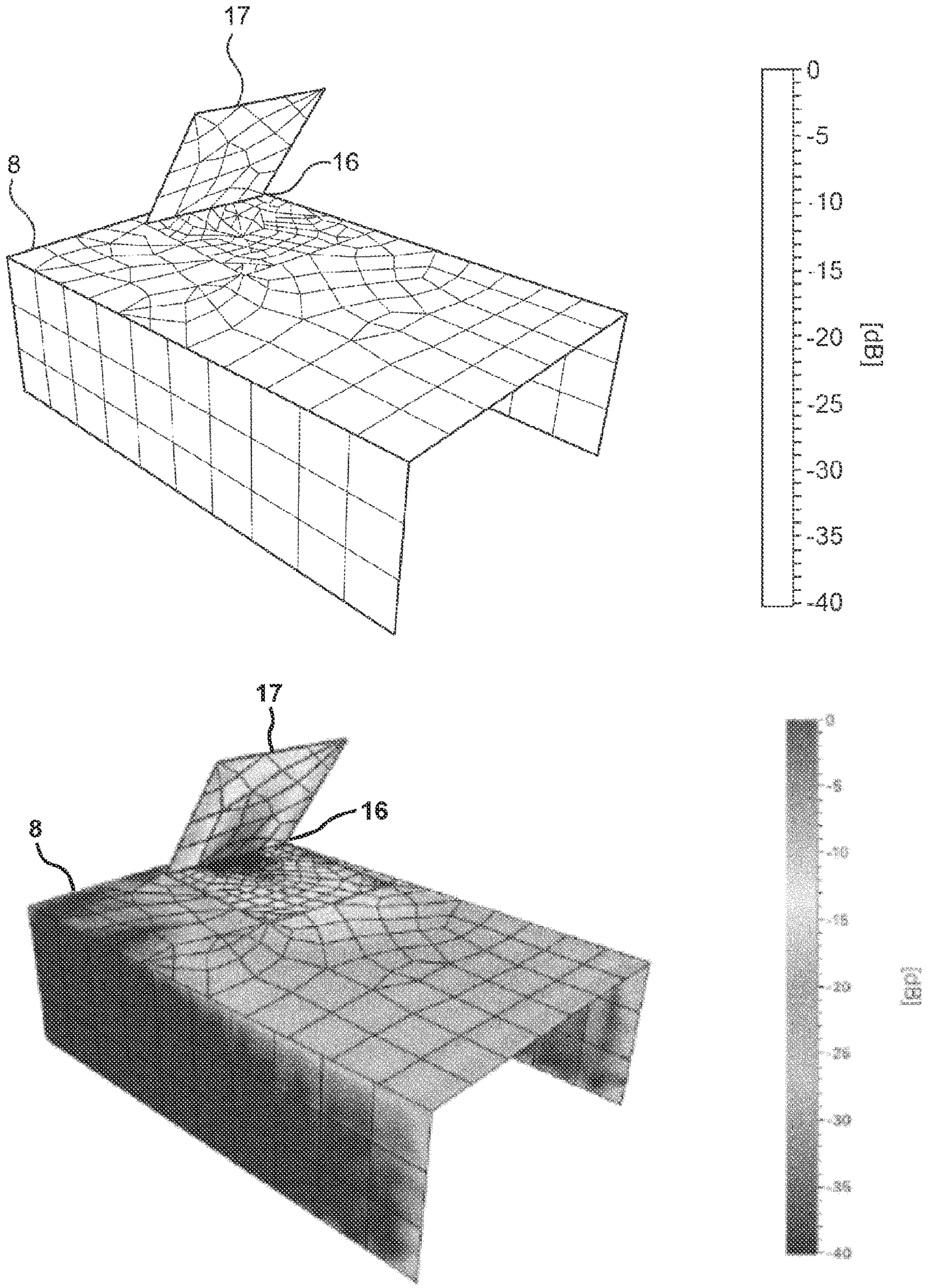
FIG. 4*c* illustrates the surface currents from the feed structure.

FIG. 4*c* illustrates an RF model of the feed and shows the electric surface current density at 8.4 GHz. It is seen that the strongest currents are localized on the primary feed element 16 and the secondary feed element 17, which in this case is the same as the deployable element 50. It is also seen that there is a contribution from the first surface 10 of the satellite 8. Thus, in this embodiment, the resulting incident field 20 results from the primary feed element 16, the secondary feed element 17 and the first surface 10.

It should be noted that typically, the feed structure 4, 16, 17 includes a feed to excite the feed structure 4, 16, 17 in any know way, thus, also when reference is made to the feed structure 4, such feed structure includes a feed to excite the feed structure 4 in any know way, e.g. via a microstrip, via a coax cable, etc.

Figure 5:
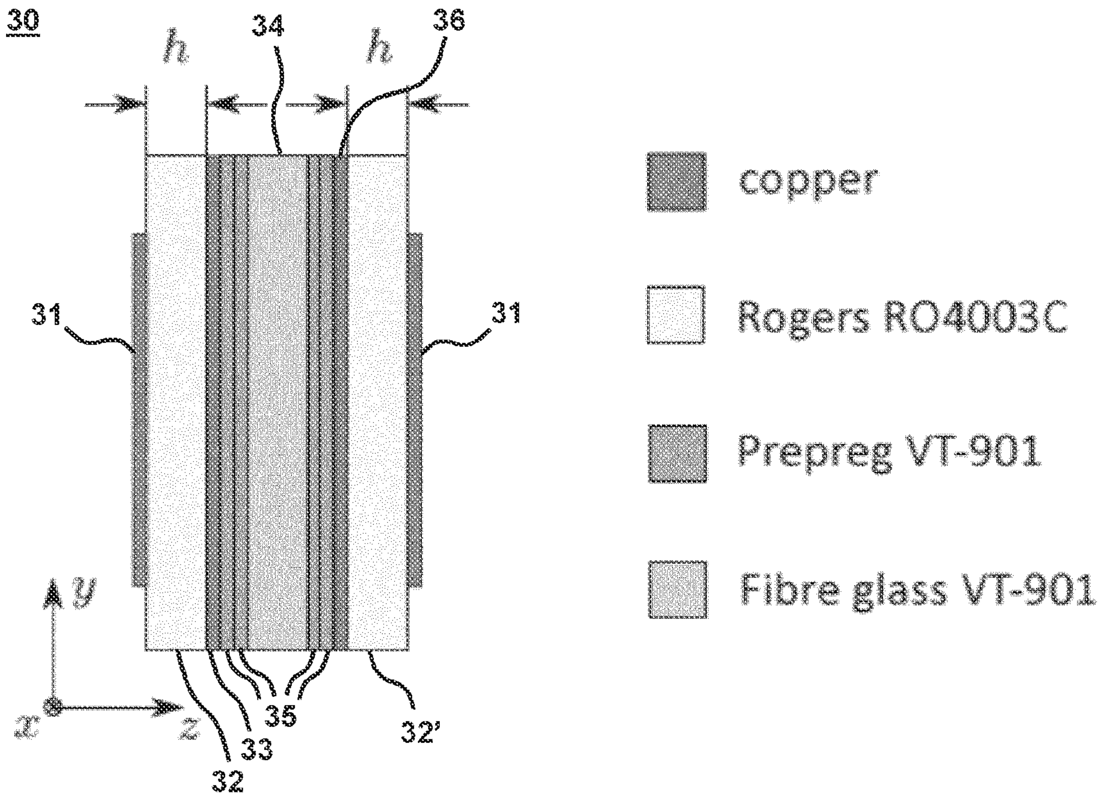
FIG. 5 illustrates schematically a support layer as seen from the side.

FIG. 5 illustrates schematically a support layer as seen from the side, The array elements 24 are arranged at or in a support layer 30. The array elements 24 are for example provided in a conducting layer 31, such as copper, provided on a dielectric substrate 32, such as on a Rogers substrate. The array elements 24 may be printed on the surface of the dielectric substrate using any known processes. The other side of the dielectric substrate, i.e. the backside of the dielectric substrate 32 is provided with a conducting layer 33, such as a copper layer, to provide a ground layer for the array elements. Typically, a stability core 34 is provided to increase the mechanical stability of the antenna array 6, and of any antenna array panels 7, 7', 7". The dielectric substrate 32 may be positioned on a stability core 33, such as a glass fibre core. The stability core 34 may be treated with one or more layers of prepreg 35 for assembly with the metal coated dielectric layer.

To ensure a symmetric antenna array 6, a further dielectric substrate 32' is provided at the back side of the stability core 34, the further dielectric substrate 32' having a metal layer 36, such as a copper layer, on both sides. The total layer of such an antenna array may be kept at less than 3 mm, such as at 2.178 mm+/−10%.

In a specific example, the electrical properties of the support layer is as follows:

| Material | $\epsilon_r$ | tan δ | Thickness [mm] |
|---|---|---|---|
| Rogers RO4003C | 3.55 | 0.0027 | 0.813 |
| Ventec VT-901 glass fibre | 4.05 | 0.012 | 0.152 |
| Ventec VT-901 prepreg | 4.05 | 0.012 | 0.065 |
| Copper | $\sigma$ = 58 MS/m | | 0.035 |
| Total thickness | N/A | | 2.178 |

Figure 6:
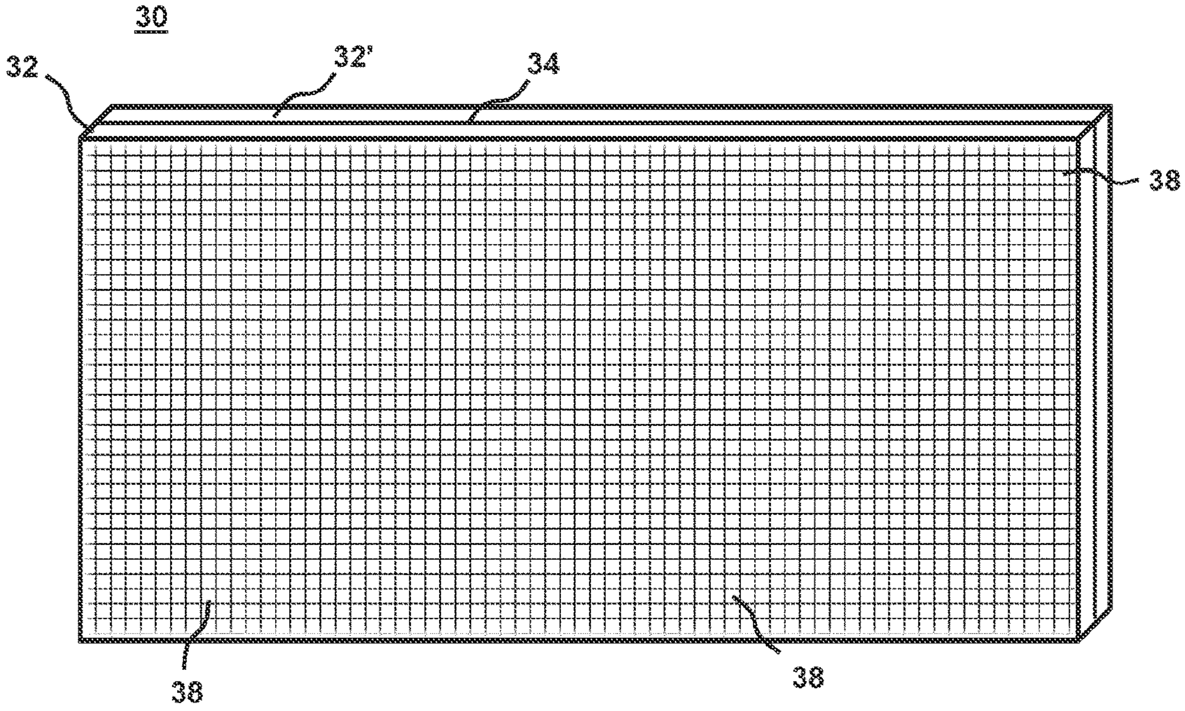
FIG. 6 illustrates schematically a support layer with unit cells.
Figure 7A:
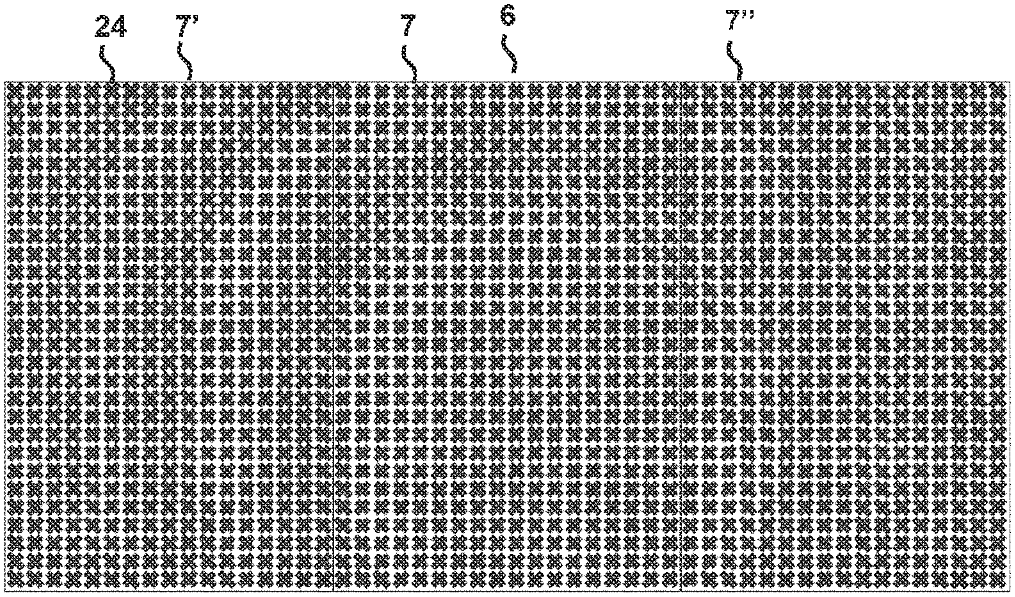
FIGS. 7*a*-7*b* illustrate schematically an antenna array and an expanded part of the antenna array.
Figure 7B:
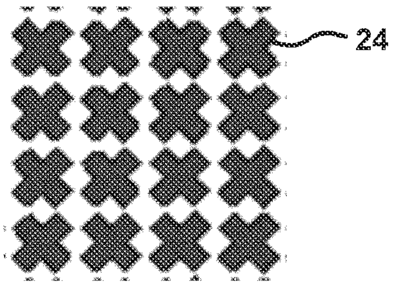

In FIG. 6 it is illustrated schematically that an antenna array 6 has a plurality of unit cells 38 distributed regularly over the antenna array 6. Such a unit cell 38 may measure between 9-11 mm in both height and width. Each unit cell 38 comprises an array element 24. FIG. 7*a* illustrates a specific cross-shaped array element 24, the array elements 24 being distributed in the different unit cells. As is seen, the geometry of the array element 24 is dependent on the position of the unit cell 38 on the antenna array 6. FIG. 7*b* shows an expanded part of the antenna array 6. In the present example, the unit cells are shown as square or rectangular. The unit cell may also be polygonal, such as hexagonal, etc.

The feeding structure of e.g. FIG. 3*b* provides a linearly polarized incident field illuminating the antenna array, the antenna array focuses the reflected/transmitted signal and simultaneously converts the incident linearly polarized field to a circularly polarized reflected/transmitted field. This is achieved by e.g. utilizing array elements that provide a relative phase shift of ±90° between the two orthogonal linear components of the reflected field.

The phase behaviour of the reflected field depends on the geometry of the array elements as well as the thickness and material properties of the support layer and the incident field at the specific array element.

Figure 8:
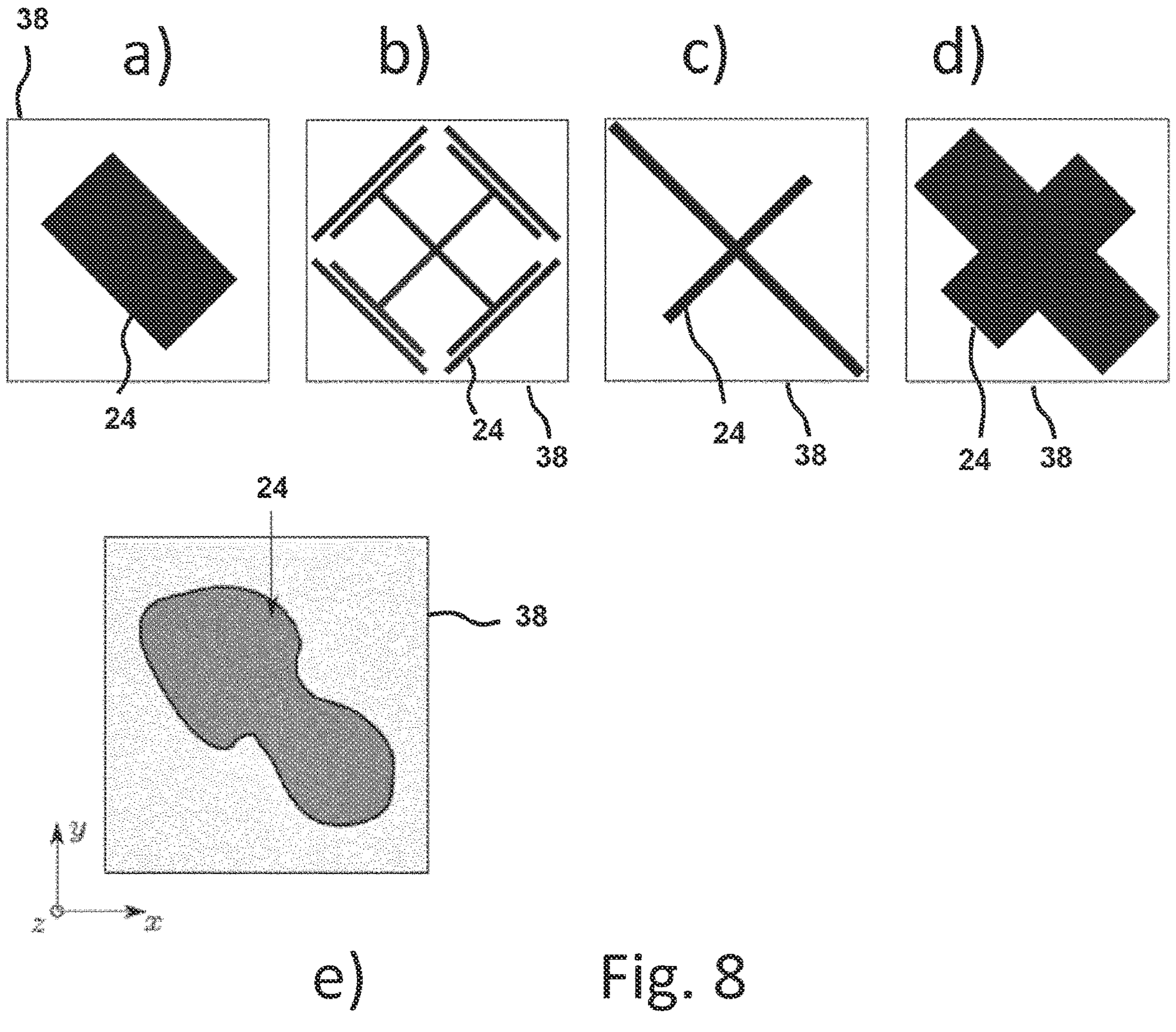
FIGS. 8*a*-8*e* illustrate schematically various array element geometries.

A number of different array elements may be used, including a rotated rectangular patch, as shown in FIG. 8*a*, a multi-resonance element as shown in FIG. 8*b*, a strip cross of different strip length to thickness ratios, as seen in FIGS. 8*c* and 8*d*. It is envisaged that many geometries can be used as the array element. It is advantageous that the element has at least one axis having an angle of 45 degrees, such as at 45 degrees+/−2 degrees, such as at 45 degrees+/−5 degrees with respect to at least one other axis of the array element, as is illustrated in FIG. 8*e*. The array element 26 may in some examples comprise a loop, the loop may be of any shape including, elliptical, rectangular, etc.

As is seen, the array elements in FIGS. 8*a*, 8*c*, 8*d* and 8*e* are asymmetric array elements. The array element in FIG. 8 is symmetric, but may be rendered asymmetric should this be needed.

The array elements 24 may provide a controlled reflection/transmission phase of the incident field. The geometrical dimensions of the array elements may be varied from unit cell to unit cell. The thickness, the length, the rotation, the symmetry of an array element may be adapted to ensure that a predetermined radiation pattern is obtained by the antenna array 6. By varying the geometry of the array elements across the antenna array, in dependence on the properties of the incident field at a specific array element, an electrically controlled array element is not needed for controlling the array element properties.

The antenna array is a passive polarising and focusing antenna array configured for polarising and focusing an incoming RF signal, i.e. the incident field.

Figure 9:
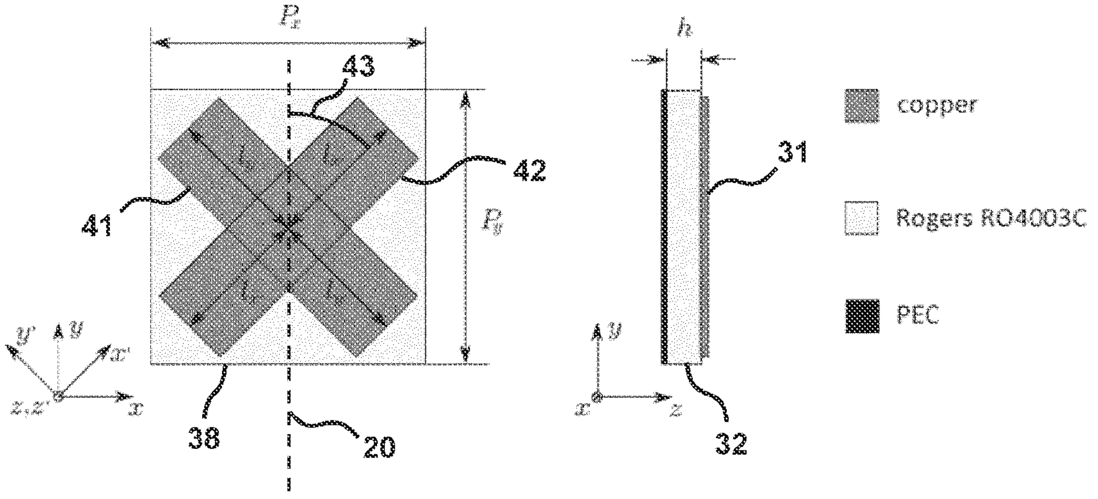
FIG. 9 illustrates a selected array element geometry in more detail.

In FIG. 9, an array element having two crossed dipoles 41, 42 at an angle 43 of 45 degrees with respect to the polarization of the incident field is shown. It should be noted that the angle 43 may be substantially 45 degrees, such as an angle of 45 degrees+/−2 degrees, such as an angle of 45 degrees+/−5 degrees. Two coordinate systems are introduced, an xy-coordinate system that is aligned with the unit-cell boundaries and the rotated coordinates x' y' that are aligned with the strips, i.e. with the at least one axis of the array element. A square unit-cell with period Px=Py=11.10 mm is used and the width of the strips, w=3.5 mm, is maximised for the given unit-cell size in order to achieve a less steep reflection phase response as a function of the dipole length parameters $l_x$ and $l_y$. By illuminating the array elements with a vertically (or horizontally) polarized field (or wave), and adjusting the strip lengths $l_x$ and $l_y$ such that the ±90 degree phase shift is achieved, the reflected wave will be right-hand or left-hand circularly polarized. Typically, the strip lengths $l_x$ and $l_y$ are different.

The bandwidth of an antenna array may be dependent on the thickness of the substrate 32, or the support layer 30. In FIG. 9, the thickness of the dielectric substrate is denoted h. The support layer typically has a thickness below 1 mm, such as about 0.8 mm in order to fulfil the requirements of the total reflectarray thickness being less that 10 mm in the first state, such as a stowed state. This will affect the achievable bandwidth and phase range of the reflectarray.

In some examples, the support layer may be an all-metallic support layer so that the support layer does not comprise a dielectric substrate. In some examples, the array elements are formed in a metal layer, such as in a conducting layer and formed using indentations and/or protrusions in the material.

Figure 10A:
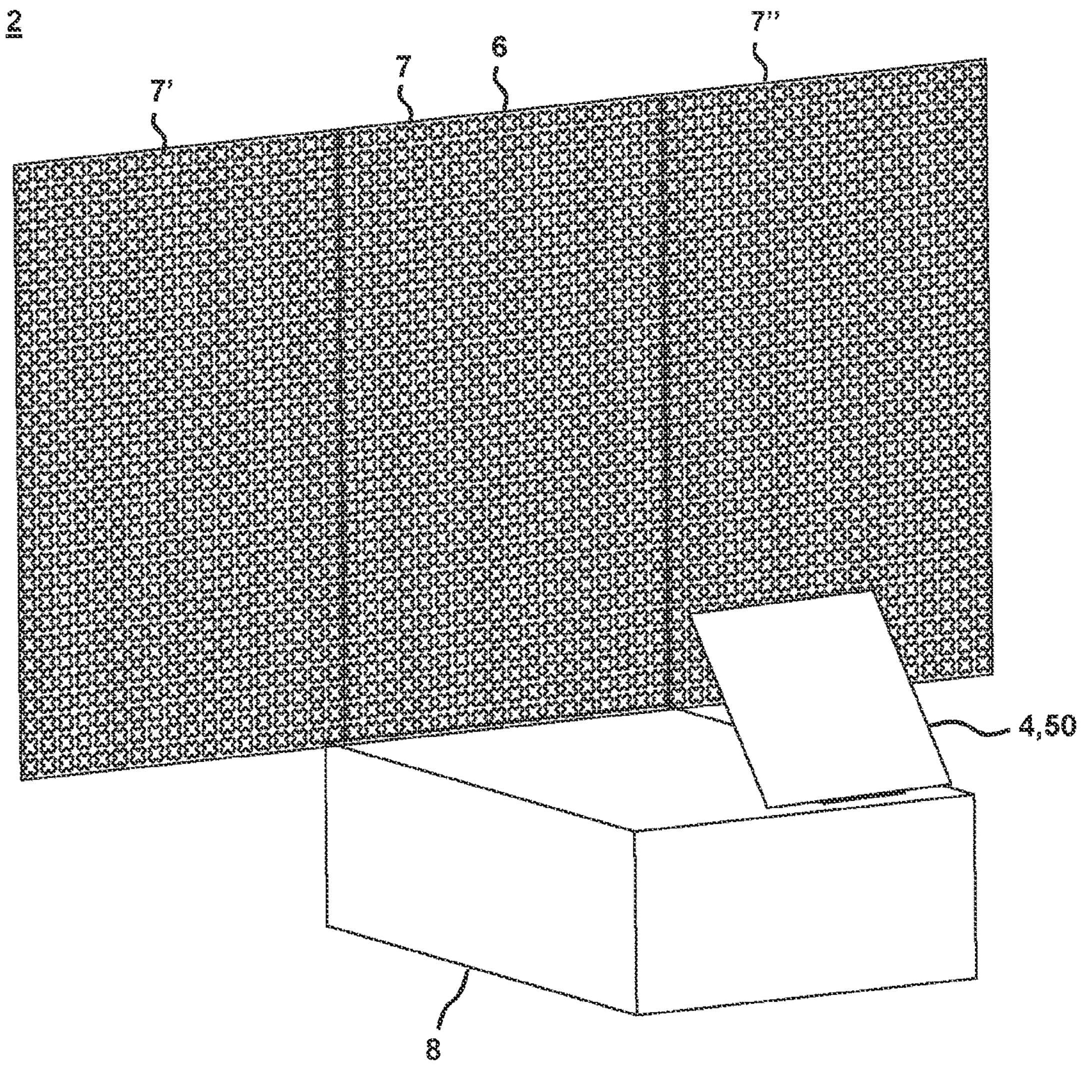
FIGS. 10*a*-10*c* illustrate schematically an antenna system having an antenna array and a feed structure.
Figure 10B:
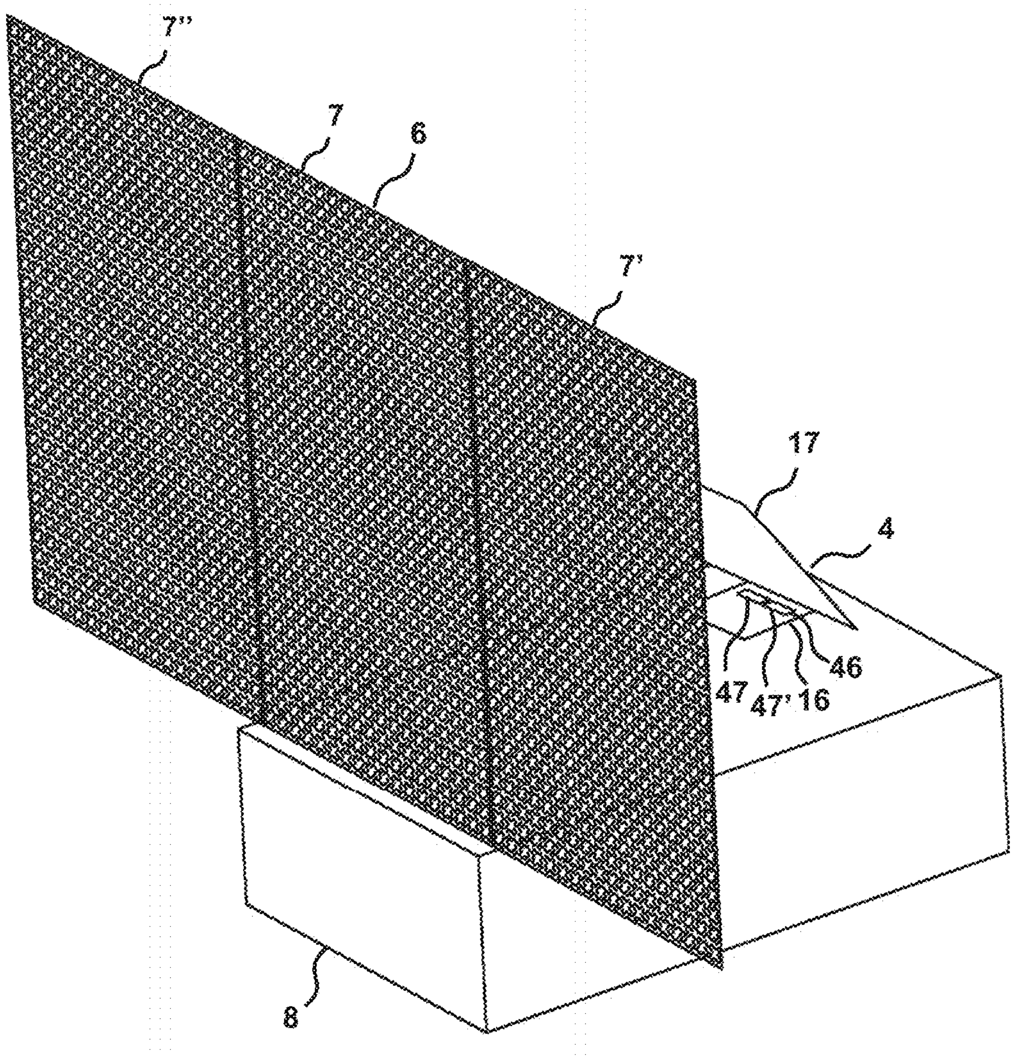
Figure 10C:
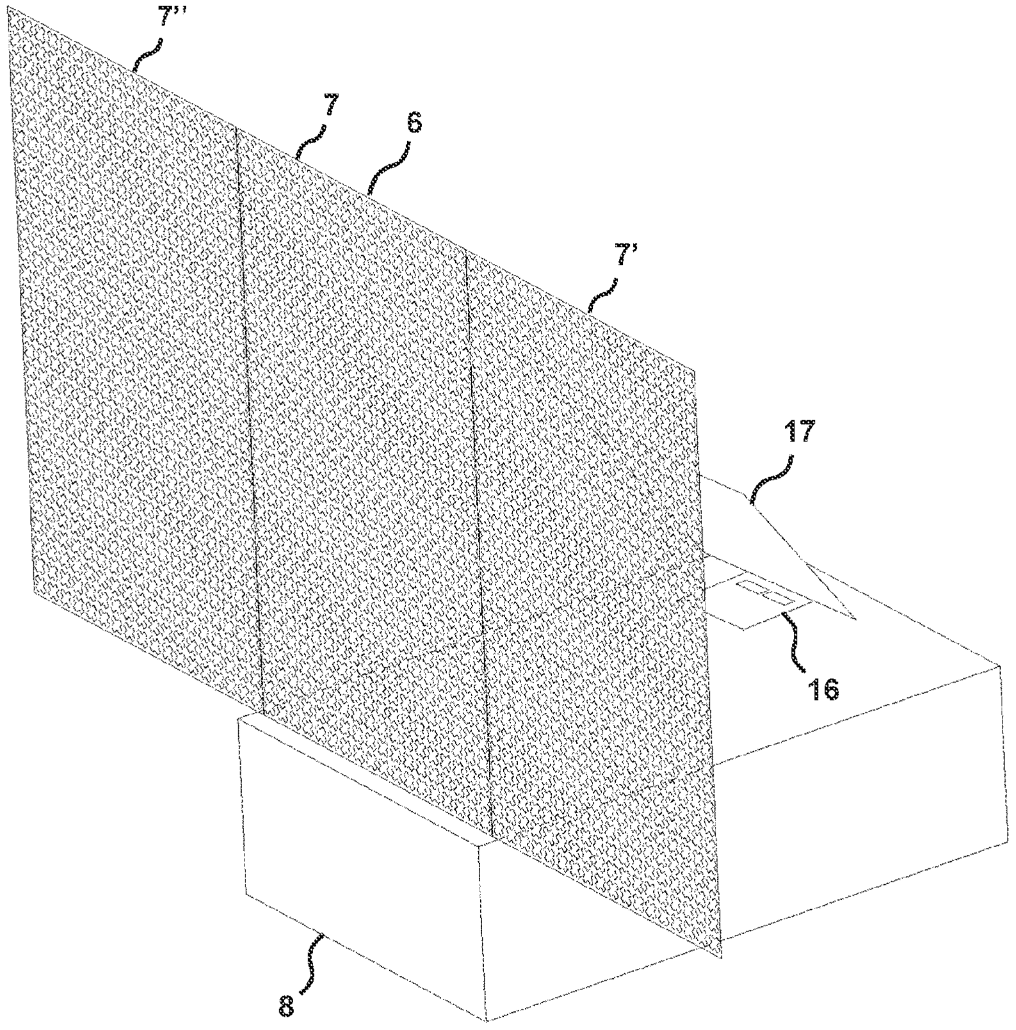

FIGS. 10*a*-10*c* illustrate schematically an antenna system 2 having an antenna array 6 and a feed structure 4, the feed structure 4 having at least one deployable element 50. The antenna array 6 is deployed and it is seen that the antenna array is provided at 3 panels 7, 7', 7" which are not tilted with respect to one another. The panels 7, 7', 7" may be folded over the satellite for stowing. It is seen that the feed structure 4 is off-set with respect to the center of the antenna array 6, and thus with respect to the center axis 9 of the satellite 8, such as the center axis 9 of the first side 10 of the satellite 8. The array elements are shaped as crosses, e.g. as shown in FIGS. 7*a*-*b*, FIG. 8*d* and in FIG. 9.

In FIG. 10*b*, the antenna system 2 is shown from a different perspective, and the feed structure 4 may be tilted to form an angle different from 0 degrees with respect to the antenna array panels 7, 7', 7". The feed structure 4 comprises a primary feed element 16 comprising a slot antenna 46 in the form of two slots 47, 47' fed by a cavity feed (not shown in FIG. 10*b*). The secondary feed element 17 comprises a rectangular conductive element, such as sub reflector 17.

FIG. 10*c* shows a transmit antenna array 6, as illustrated by the transparency of the antenna array 6.

Figure 11A:
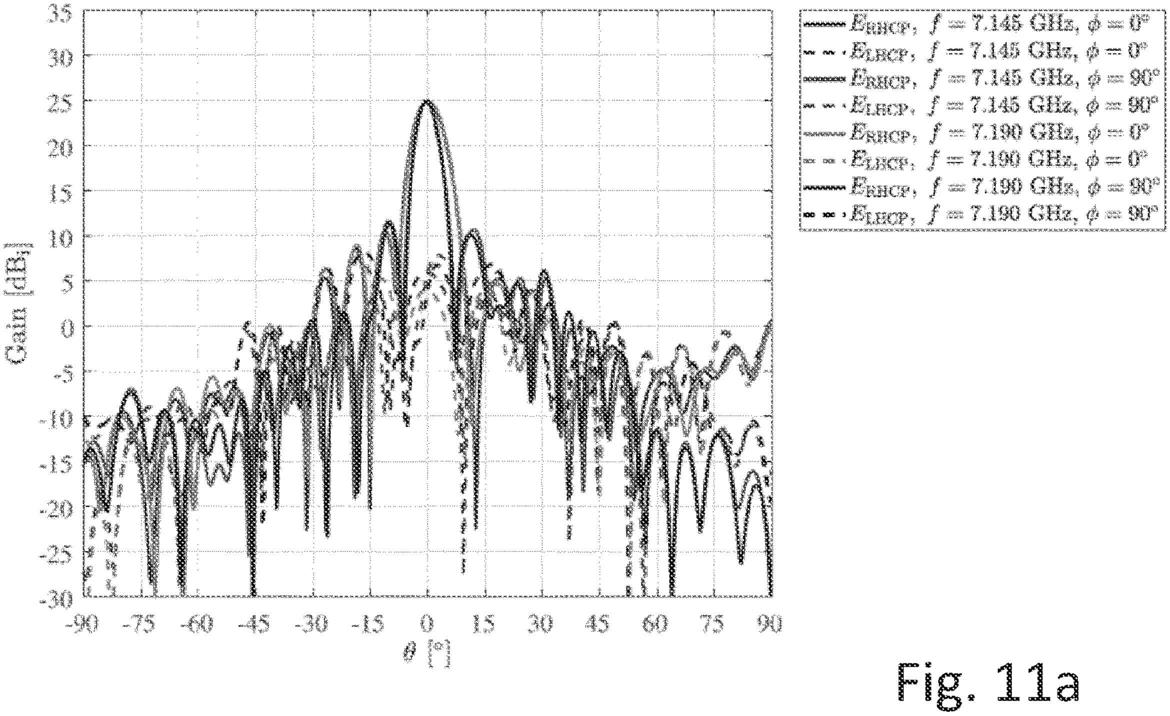
FIGS. 11*a* and 11*b* illustrate the radiation pattern of an antenna system.
Figure 11B:
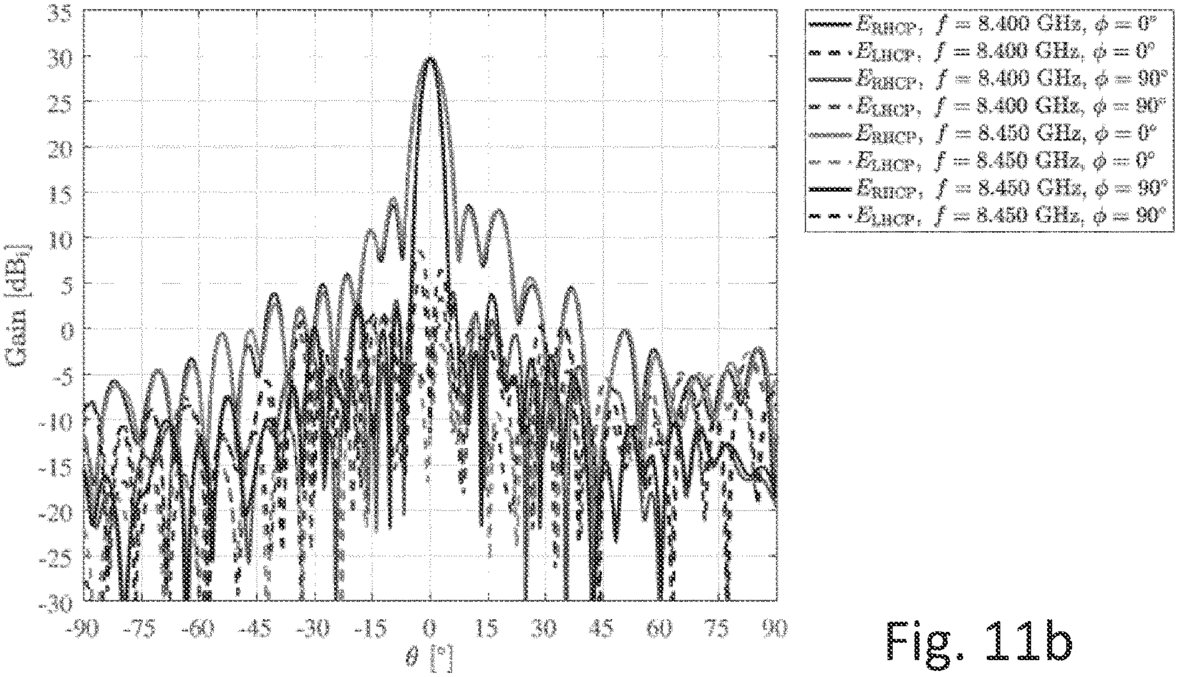

FIGS. 11*a* and 11*b* illustrate the radiation pattern of the antenna system disclosed.

The reflection coefficient of array elements has been simulated as a function of a design parameters of the array element and the support layer, including geometrical parameters of the array elements, including shape, size and thickness of the array elements, and including e.g. a thickness of the support layer to arrive at a predetermined radiation pattern. The performance of the antenna array, in this case a reflectarray is evaluated using a feed structure as herein disclosed. The array elements are optimized for operation in the Tx-band between 8.025-8.40 GHz for an Earth Observation (EO) mission, or at both Rx-band between 7.145-7.19 GHz and the Tx-band between 8.40-8.45 GHz for a Deep Space (DS) mission. The calculations are carried out using a higher-order spectral domain method of moment (SD-MoM) solver. In the solver the periodic problem is formulated in terms of an IE (Integral Equation) and solved in the spectral domain. The Green's function on the IE consists of a double summation of Floquet harmonics. The SDMoM is configured to handle a plurality of dielectric layers, but the metallization layers must be confined to the interfaces between the dielectric layers.

In the array element calculations the SDMoM solver (by TICRA) was used locally for each reflectarray element to determine the equivalent currents associated with the given element. These equivalent currents were then used to calculate the far-field of the reflectarray. The geometry of all the array elements was optimised simultaneously on a global level, using a non-linear minmax optimization algorithm. The illumination of the antenna array was modelled using a feed structure as herein disclosed which was simulated using higher-order method of moments (MoM). In all antenna array simulations the far-field is evaluated with respect to an output coordinate system.

This coordinate system is defined such that the z-axis is aligned with the direction of specular reflection of the feed illumination by the antenna array, at an elevation of 21° from the normal vector of the reflectarray panels. The y-axis is directed parallel to the CubeSat body, and the x-axis is pointing away from the CubeSat in a direction orthogonal to the y and z-axes to achieve a right-handed orthogonal coordinate system.

FIG. 11*a* shows Tx band simulation results of a reflectarray as disclosed, and FIG. 11*b* shows Rx-band simulation results of the same reflectarray. The simulations are performed using a y-polarized cavity feed antenna.

A peak gain of 29.25 dB in the EO mission Tx-band, an XPD better than 24.8 dB and side lobe levels of 15.6 dB below the on-axis gain have been achieved. The antenna array, including the plurality of array elements, was then re-optimised for the DS mission and the results are presented in FIGS. 11*a* and 11*b*. In the Rx-band (FIG. 11*a*) the peak gain is 24.62 dB, the XPD is better than 17.6 dB and the side lobe levels are 13.1 dB below the on-axis gain. In the Tx-band a peak gain of 29.63 dB was achieved, the XPD is better than 25.1 dB and the side lobe levels are 15.3 dB below the on-axis gain. Thus, it is seen that the present antenna system provides a better aperture efficiency and an increased wideband frequency performance.

REFERENCE NUMBERS

2 antenna system
4 feed structure
5 satellite body
6 antenna array
7 center panel
7' 7" outer panels, side panels
8 satellite
9 center axis
10 first side of the satellite
11 first end of first side
13 second end of first side
12, 14 deployment mechanism
15 stabilizing bars
16 primary feed element
17 secondary feed element
18 reflected field
19 transmitted field
20 incident field
21 opening angle
22 feed structure angle
24 array elements
25 microstrip patch array
26 patch
27 fixed slot array
28 slot antenna elements
29 excitation cavity
30 support layer
31 conducting layer
32, 32' dielectric substrate
33 ground layer
34 stability core
35 prepreg
36 conducting layer
38 unit cell
41, 42 crossed strips
43 angle between strips
46 slot antenna
47, 47' slots
48 first cavity
49 second cavity
50 deployable element
51 first off-set angle
52 second off-set angle Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents

The invention claimed is:

1. An antenna system for satellite applications, the antenna system comprising an antenna array and a feed structure, the antenna array and at least a part of the feed structure being configured to be mounted for deployment above a first surface of a satellite, the antenna array being a passive antenna array and being configured to have a first antenna array state and a second antenna array state, the second antenna array state being a deployed antenna array state, the feed structure being configured to have a first feed structure state and a second feed structure state, the first feed structure state being a stowed state and the second feed structure state being a deployed feed structure state, wherein the feed structure comprises a deployable element, and wherein the deployable element is a planar element, wherein the feed structure is a feed structure having no dielectric elements and being configured to provide a linearly polarized incident field for the antenna array in the deployed feed structure state, and wherein the feed structure comprises a radiating element array, including one of an array of radiating slots and an array of radiating patches;

the antenna array comprising a plurality of array elements, and wherein the plurality of array elements forms a polarization conversion surface configured for converting the linearly polarized incident field to a reflected/transmitted circular polarized field.

2. The antenna system according claim 1, wherein the antenna array is configured so that a radiation pattern of the reflected/transmitted circular polarized field corresponds to a predetermined radiation pattern and wherein an array element geometry and an array element position of each of the plurality of array elements are configured to provide the predetermined radiation pattern.

3. The antenna system according to claim 2, wherein the array element geometry is configured to control a phase response and/or a polarisation response of the array element of the plurality of array elements to obtain the predetermined radiation pattern.

4. The antenna system according to claim 1, wherein the feed structure comprises a primary feed element and a secondary feed element and wherein the deployable element comprises the secondary feed element.

5. The antenna system according to claim 4, wherein the primary feed element is configured to excite the secondary feed element in the deployed feed structure state to provide an excited secondary feed element, and wherein the linearly polarized incident field is provided by the primary feed element and the excited secondary feed element.

6. The antenna system according to claim 5, wherein the primary feed element comprises the radiating element array, and wherein the secondary feed element comprises an electromagnetic reflecting surface including a conductive surface, and a reflectarray.

7. The antenna system according to claim 6, wherein the deployable element comprises the radiating element array.

8. The antenna system according to claim 1, wherein the antenna array is provided at one or more panels, including a single panel configuration or a multi-panel configuration, wherein the plurality of array elements are arranged at or in a support layer, and wherein the support layer comprises a composite material; wherein the support layer comprises a metallic material, wherein the support layer comprises a membrane, wherein the support layer comprises a canopy, a foil, or a honeycomb structure.

9. The antenna system according to claim 1, wherein the antenna system is configured for receiving, emitting and transmitting electromagnetic radiation in a frequency range from 6-100 GHz.

10. The antenna system according to claim 1, wherein the plurality of array elements are patch elements or wherein the plurality of array elements are cross dipole elements.

11. The antenna system according to claim 1, wherein each array element of the plurality of array elements is characterized by an array element position and an array element geometry.

12. The antenna system according to claim 11, wherein a first array element has a first array element geometry being determined in dependence of a phase of the linearly polarized incident field at a position of the first array element; and being determined in dependence of any surrounding array elements and a phase of the linearly polarized incident field at a position of each surrounding array elements.

13. The antenna system according to claim 11, wherein the array element geometry is configured to have at least one axis forming an angle of 45° with respect to a polarization of the linearly polarized incident field.

14. The antenna system according to claim 1, wherein the plurality of array elements are asymmetric array elements.

15. The antenna system according to claim 1, wherein the linearly polarized incident field is a vertically or horizontally polarized incident field, and wherein the plurality of array elements are configured so that at least one axis of each array element of the plurality of array elements is aligned in an angle of 45 degrees+/−10 degrees, with respect to a polarization of the linearly polarized incident field.

16. An antenna system for satellite applications, the antenna system comprising an antenna array and a feed structure, the antenna array and at least a part of the feed structure being configured to be mounted for deployment above a first surface of a satellite, the antenna array being a passive antenna array and being configured to have a first antenna array state and a second antenna array state, the second antenna array state being a deployed antenna array state, the feed structure being configured to have a first feed structure state and a second feed structure state, the first feed structure state being a stowed state and the second feed structure state being a deployed feed structure state, wherein the feed structure comprises a deployable element, and wherein the feed structure is planar when the deployable element is stowed in the first feed structure state, wherein the feed structure is an all-metal feed structure and being configured to provide a linearly polarized incident field for the antenna array in the first-deployed feed structure state, and wherein the feed structure comprises a radiating element array, including one of an array of radiating slots and an array of radiating patches;

the antenna array comprising a plurality of array elements, and wherein the plurality of array elements forms a polarization conversion surface configured for converting the linearly polarized incident field to a reflected/transmitted circular polarized field.

* * * * *